(12) United States Patent
Konishi et al.

(10) Patent No.: US 6,724,559 B1
(45) Date of Patent: Apr. 20, 2004

(54) MAGNETIC TAPE UNIT

(75) Inventors: Hironao Konishi, Hyogo (JP); Tatsuya Yumioka, Hyogo (JP); Masaharu Tosa, Hyogo (JP); Takanobu Kashiwagi, Hyogo (JP); Yukio Sekiguchi, Hyogo (JP); Tadayoshi Yamamoto, Hyogo (JP); Hiroyuki Miyata, Akashi (JP)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 09/703,539

(22) Filed: Nov. 1, 2000

(30) Foreign Application Priority Data

Mar. 6, 2000 (JP) ........................................ 2000-060490

(51) Int. Cl.$^7$ ............................ G11B 20/20; G11B 5/00
(52) U.S. Cl. .................... 360/76; 360/77.01; 360/77.12
(58) Field of Search ............................ 360/76, 77.03, 360/78.02, 75, 77.01, 77.12, 77.13, 78.01

(56) References Cited

U.S. PATENT DOCUMENTS 6,084,740 A * 7/2000 Leonhardt et al. ....... 360/78.02

6,429,411 B1 * 8/2002 Iwasaki et al. .......... 250/201.5

FOREIGN PATENT DOCUMENTS

JP 7057229 3/1995

* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

A magnetic tape unit includes a magnetic tape provided with a plurality of tracks, a magnetic head for writing or reading data from the tape, a position determiner for monitoring the relative position between the tape and the head, and a position compensator for adjusting this relative position. The monitoring by the position determiner is performed based on signals read out from the servo control tracks of the tape. The position compensator keeps the magnetic head and tape in proper positional relation based on the results of the monitoring by the position determiner.

8 Claims, 22 Drawing Sheets

MAGNETIC TAPE UNIT

BACKGROUND OF THE INVENTION

1. Field of the Invention

The present invention relates to a magnetic tape unit provided with a magnetic read/write head which is arranged to simultaneously access a plurality of tracks on a magnetic tape for data-writing and data-reading.

2. Description of the Related Art

Magnetic tape units have been widely used as e.g. external storage apparatus for a computer system. To write and read data from the tracks (user data tracks) provided on a magnetic tape, use is made of a read/write head arranged in facing relation to the tape. Typically, such a magnetic head is provided with a plurality of channels the number of which is equal to the number of the tracks on the tape. In this equal-number arrangement, no mechanism is provided for adjustably moving the magnetic head in the widthwise direction of the tape.

One way to increase the recording density of a magnetic tape is to increase the user data tracks. Accordingly, the channels of the magnetic head is also increased. There is a limit, however, to the number of the head channels on grounds of performance and cost. Thus, in an instance where the magnetic tape is provided with a greater number of tracks than the head channels, it is necessary to move the magnetic head in the widthwise direction for causing the head to access any selected tracks on the tape. For controlling such widthwise movement of the head, servo control tracks are additionally provided on the tape. An example of thus arranged magnetic tape unit is disclosed in JP-A-7 (1995)-57229.

In the conventional magnetic tape unit, however, there may be a problem of deterioration of the SNR (signal-to-noise ratio) when the magnetic tape and the magnetic head fail to be held in proper facing relation to each other. With an unduly reduced SNR, an error may occur in reading or writing data.

Further, in the conventional unit, the magnetic head is brought to a selected point of the magnetic tape (in its longitudinal direction) in a "relative" controlling manner. Specifically, the conventional unit is provided with reel motors for moving the magnetic tape forward or backward past the magnetic head. Each reel motor is associated with a sensor for counting the number of revolutions of the relevant motor. Based on the resulting count number and some other information, the longitudinal positioning of the magnetic head relative to the tape is performed. This means that the longitudinal position of the tape is not directly detected, but only indirectly (or relatively) through the operation of the reel motors. In this manner, however, a detection error will occur e.g. when the magnetic tape is slipped on the tape guides driven by the reel motors.

Still further, in the conventional unit, the running speed of the magnetic tape is calculated based on the revolution number of the reel motors measured within a certain period of time. In this manner again, only the "relative" tape speed can be known through the operation of the motor, while the actual tape speed may fail to be detected.

SUMMARY OF THE INVENTION

The present invention has been proposed under the above-described circumstances. It is, therefore, an object of the present invention to provide a magnetic tape unit capable of performing data-reading and data-writing operations with great accuracy. To this end, the following technical measures are taken.

According to a first aspect of the present invention, there is provided a magnetic tape unit including a magnetic tape, a magnetic head, a relative position determiner and a position compensator.

The magnetic tape is provided with a plurality of tracks including at least first and second servo control tracks. Each of the servo control tracks is provided with identical pieces of data which are spaced from each other in the longitudinal direction of the tape, wherein the pieces of data on the first servo control track are aligned with the pieces of data on the second servo control track in a widthwise direction of the tape.

The magnetic head is arranged to simultaneously access a plurality of tracks on the tape for data-writing and data-reading.

The relative position determiner determines the relative positional relation between the magnetic head and the magnetic tape based on signals read out from the servo control tracks.

The position compensator keeps the magnetic head and the magnetic tape in proper positional relation by adjusting the relative positional relation between the head and the tape based on the determination of the relative position determiner.

With such an arrangement, the detected skew of the magnetic tape relative to the magnetic head can be compensated based on the difference in phase of read-out signals obtained from the servo control tracks. Further, the facing relation between the magnetic head and tape can be adjusted based on the difference in level of the read-out signals from the servo control tracks.

According to a second aspect of the present invention, there is provided a magnetic tape unit which includes a magnetic tape, a magnetic head and a running condition determiner.

The magnetic tape is provided with a plurality of tracks including at least one servo control track provided with pieces of data spaced from each other in a longitudinal direction of the tape.

The magnetic head is arranged to simultaneously access a plurality of tracks on the tape for data-writing and data-reading.

The running condition determiner determines the running condition of the tape based on a signal read out from the servo control track.

The running condition of the tape may be a running position of the tape relative to the magnetic head. Here, the running position of the tape means the longitudinal position of the tape which the magnetic head is currently facing.

Another example of the running condition of the tape may be a running speed of the tape relative to the magnetic head. Here, the running speed of the tape refers to the current speed of the tape at which the magnetic tape is moved relative to the magnetic head.

With the above arrangement provided by the second aspect of the present invention, the running position or speed of the magnetic tape can be correctly determined by counting on the read-out signals from the servo control tracks, even if slippage occurs between the magnetic head and a tape feeding mechanism.

According to the second aspect of the present invention, the magnetic tape may be provided with two or more servo control tracks. The respective servo control tracks may be provided with pieces of data at non-aligned intervals. In this case, the running position of the magnetic tape can be more accurately determined by counting the pulses of signals obtained from the servo control tracks.

Further, a servo control track may be provided with pieces of data spaced from each other at partially non-equal intervals. In this case, it is possible to reduce the scale of a counting circuit for performing counting on a read-out signal obtained from the servo control track.

According to a third aspect of the present invention, there is provided a magnetic tape unit which includes a magnetic tape, a magnetic head and a position determiner.

The magnetic tape is provided with a plurality of tracks including at least one servo control track. This servo control track is provided with pieces of absolute position data which are spaced from each other in the longitudinal direction of the tape.

The magnetic head is arranged to simultaneously access a plurality of tracks on the tape for data-writing and data-reading.

The position determiner determines a running position of the tape based on information read out from the servo control track.

With the use of absolute position data, it is possible to eliminate the error in determining the running position of the tape which would otherwise occur due to the slippage of the tape. Here, the "absolute position data" refers to data which by itself identifies a longitudinal position of the magnetic tape.

According to a fourth aspect of the present invention, there is provided a magnetic tape unit which includes a magnetic tape, a magnetic head, a facing relation determiner and a facing relation compensator.

The magnetic tape is provided with a plurality of tracks including at least one servo control track provided with pieces of data.

The magnetic head is arranged to simultaneously access a plurality of tracks on the tape for data-writing and data-reading.

The facing relation determiner determines, based on a level of a signal read out from the servo control track, whether or not the magnetic head is held in proper facing relation to the magnetic tape.

The facing relation compensator adjusts the facing relation between the head and the tape based on the determination of the facing relation determiner.

With such an arrangement, for instance, the magnetic head may be slightly moved toward the magnetic tape, or vice versa, when the level of the read-out signal from the servo control track is smaller than the predetermined reference value. In this manner, the distance between the magnetic head and the magnetic tape can be optimized.

According to a fifth aspect of the present invention, there is provided a magnetic tape unit which includes a magnetic tape, a magnetic head, a non-magnetic portion detector and a running condition determiner.

The magnetic tape is provided with a plurality of tracks including at least one servo control track. This servo control track is provided with non-magnetic portions spaced from each other in a longitudinal direction of the tape.

The magnetic head is arranged to simultaneously access a plurality of tracks on the tape for data-writing and data-reading.

The non-magnetic portion detector detects the non-magnetic portions based on a signal read out from the servo control track.

The running condition determiner determines a running condition of the magnetic tape based on the detection of the non-magnetic portion detector.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
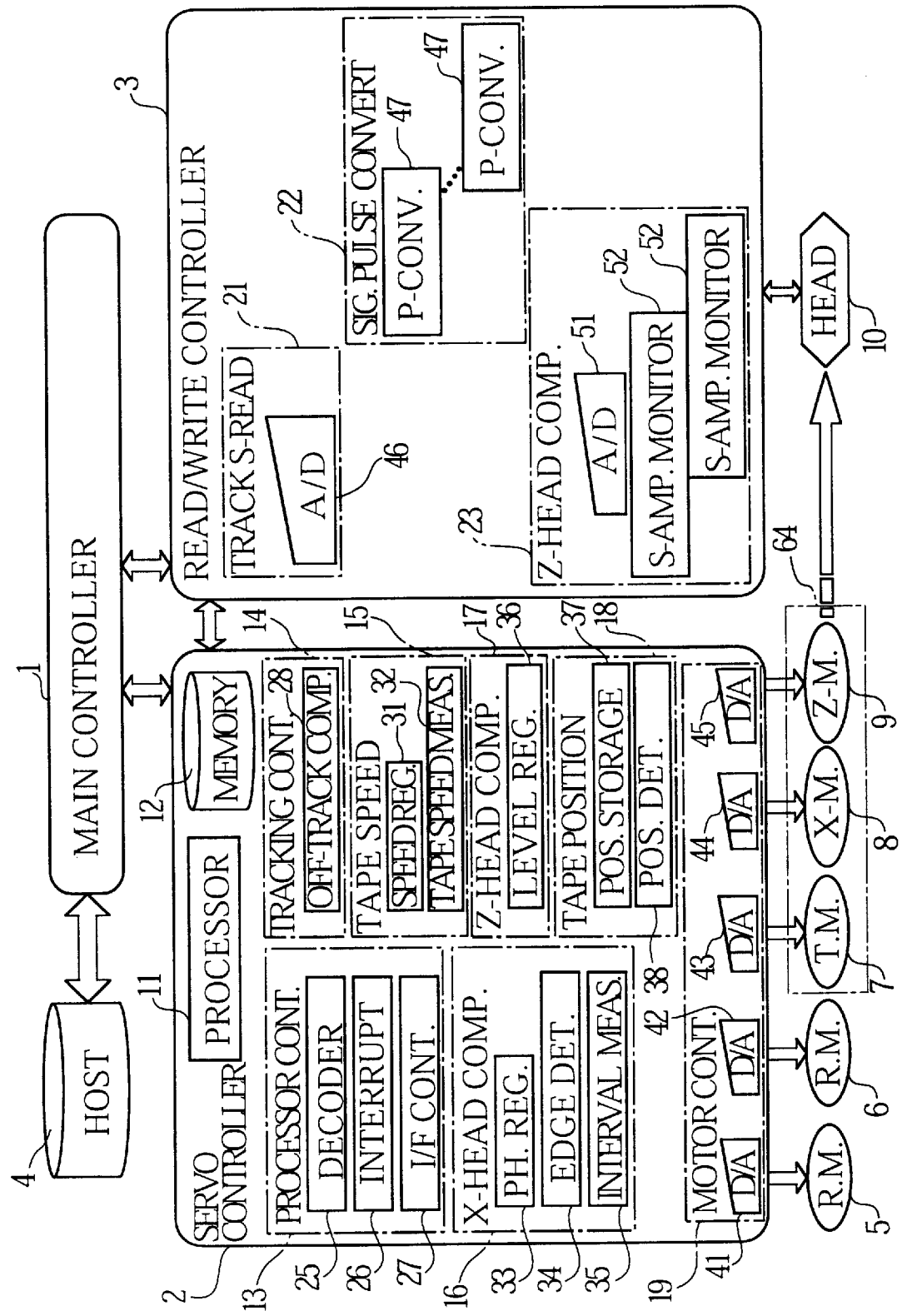
FIG. 1 is a block diagram showing principal components of a magnetic tape unit embodying the present invention.

FIG. 1 is a block diagram schematically showing the principal components of a magnetic tape unit according to a first embodiment of the present invention. As illustrated, this magnetic tap unit includes a main controller 1, a servo controller 2 and a read/write controller 3. The main controller 1, the servo controller 2 and the read/write controller 3 are connected to each other by bus lines. The main controller 1 is connected to a host computer 4. The servo controller 2 is connected to first and second reel motors 5–6, a tracking motor 7, an X-direction compensation motor 8 and a Z-direction compensation motor 9. The read/write controller 3 is connected to a magnetic read/write head 10.

The servo controller 2 includes a servo controlling processor 11, a memory 12, a processor controlling section 13, a tracking controlling section 14, a tape speed measuring section 15, an X-direction head position compensating section 16, a Z-direction position compensating section 17, a tape position identifying section 18 and a motor current controlling section 19.

The read/write controller 3 includes a tracking servo reading section 21, a read signal pulse converting section 22 and a Z-direction head position compensating section 23.

The processor controlling section 13 includes an address decoder 25, an interrupt controller 26 and an interface controller 27.

The tracking controlling section 14 includes an off-track compensating controller 28.

The tape speed measuring section 15 includes a speed register 31 and a tape speed detector 32.

The X-direction head position compensating section 16 includes a phase register 33, an edge detector 34 and an interval determiner 35.

The Z-direction position compensating section 17 includes a level register 36.

The tape position identifying section 18 includes a tape position memory 37 and a tape position finder or detector 38.

The motor current controlling section 19 includes first to fifth D/A converters 41–45.

The tracking servo reading section 21 includes an A/D converter 46.

The read signal pulse converting section 22 includes a plurality of pulse converters 47.

The Z-direction head position compensating section 23 includes an A/D converter 51 and a plurality of servo waveform amplitude monitors 52.

The main controller 1 controls the servo controller 2 and the read/write controller 3 based on the instructions from the host computer 4.

The servo controller 2, controlled by the main controller 1, performs the positioning of the magnetic tape and the magnetic head 10.

The read/write controller 3 controls the data-reading and data-writing operations of the magnetic head 10. Further, this controller 3 processes the read data or servo data outputted from the magnetic head 10, and then supplies the processed data to the main controller 1 and the servo controller 2.

The host computer 4 supplies commands to the main controller 1, thereby causing the controller to read and write user data.

The first and the second reel motors 5, 6 rotate reels for winding on and off the magnetic tape.

The tracking motor 7 moves the magnetic head 10 across (i.e., widthwise of) the magnetic tape 10, thereby causing the magnetic head 10 to access selected tracks on the magnetic tape.

The X-direction compensation motor 8 rotates the magnetic head 10 about an axis extending perpendicularly to the recording surface of the magnetic tape.

The Z-direction compensation motor 9 rotates the magnetic head 10 about an axis extending in the lengthwise direction of the magnetic tape, thereby causing the magnetic head 10 to be held in parallel facing relation to the magnetic tape.

The servo controlling processor 11 controls the servo controller 2 as a whole.

The memory 12, which may be a RAM (random access memory), stores various data and also provides a work area for the servo controlling processor 11.

The processor controlling section 13 controls the interface between the servo controlling processor 11 and its peripheral circuits.

The tracking controlling section 14 drives the tracking motor 7 based on the signals read out from the tape positioning tracks on the magnetic tape.

The tape speed measuring section 15 measures the running speed of the magnetic tape based on the signals read out from the servo tracks on the magnetic tape. Depending upon the measurements, the tape speed measuring section 15 controls the operation of the reel motors 5, 6 for adjusting the running speed of the magnetic tape.

The X-direction head position compensating section 16 controls the operation of the X-direction compensation motor 8 based on the signals read out from the servo tracks on the magnetic tape, to compensate the skew of the magnetic head 10.

The Z-direction position compensating section 17 controls the operation of the Z-direction compensation motor 9 based on the signals read out from the servo tracks on the magnetic tape, to bring the magnetic head 10 into parallel facing relation to the magnetic tape.

The tape position identifying section 18, based on the signals read out from the servo tracks on the magnetic tape, determines which part or position of the tape the magnetic head 10 is currently facing as viewed lengthwise of the tape.

The motor current controlling section 19, based on the drive data from the servo controlling processor 11, supplies power to the reel motors 5–6, the tracking motor 7, the X-direction compensation motor 8 and the Z-direction compensation motor 9.

The magnetic head 10 reads data from the tape positioning tracks on the magnetic tape, thereby producing appropriate signals. These signals are converted into tracking data by the tracking servo reading section 21, and then supplied to the tracking controlling section 14.

The magnetic head 10 reads data from a plurality of servo tracks on the magnetic tape, and outputs signals corresponding to these servo tracks, respectively. These signals are converted into servo data by the read signal pulse converting section 22, and then supplied to the tape speed measuring section 15, the X-direction head position compensating section 16 and the tape position identifying section 18.

Each of the amplitudes of the above-mentioned signals outputted by the magnetic head 10 is converted into amplitude data by the Z-direction head position compensating section 23.

The amplitude data is then supplied to the Z-direction position compensating section 17.

Figure 2:
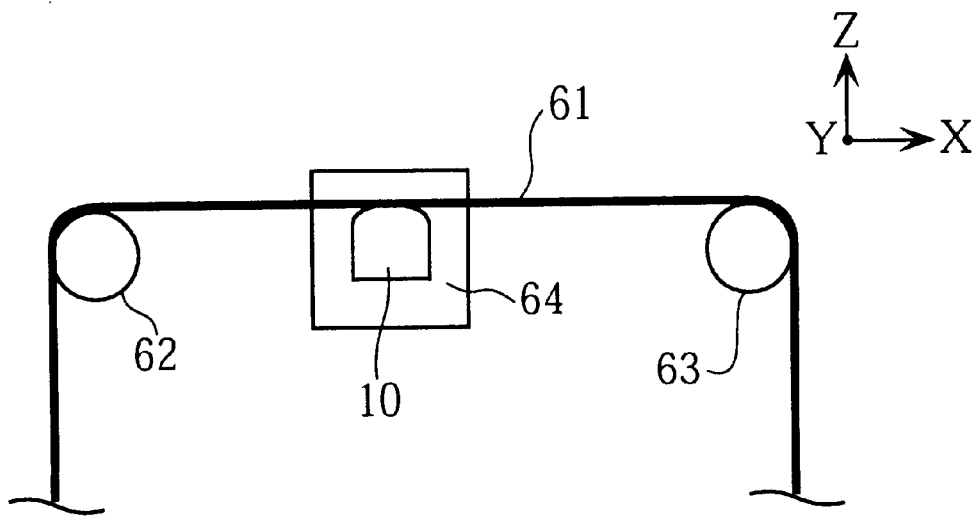
FIG. 2 is a plan view schematically showing the magnetic head of the tape unit together with other members arranged around the magnetic head.

Reference is now made to FIG. 2 which is a plan view showing the magnetic head 10 and several components arranged around this magnetic head. As illustrated, the magnetic head 10 is arranged between first and second tape guides 62–63, while also being held in facing relation to the magnetic tape 61. The second tape guide 63 is spaced from the first tape guide 62 in the X-direction, while the tape contact surface of the magnetic head 10 faces in the Z-direction. The Y-direction (and the opposite direction) is perpendicular to both the X-direction and the Y-direction.

A head position adjusting device 64 is provided for adjusting the position of the magnetic head 10 relative to the magnetic tape 61. Specifically, upon actuation of the head position adjusting device 64, the magnetic head 10 can be rotated about both an axis extending in the X-direction ("X-axis"below) and an axis extending in the Z-direction ("Z-axis"below). The magnetic head 10 can also be moved in the Y-direction or its opposite direction by the head position adjusting device 64.

The head position adjusting device 64 includes the above-mentioned tracking motor 7, X-direction compensation motor 8 and Z-direction compensation motor 9. The tracking motor 7 is actuated to move the magnetic head 10 in the Y-direction. The X-direction compensation motor 8 is actuated to rotate the magnetic head 10 about the Z-axis. The Z-direction compensation motor 9 is actuated to rotate the magnetic head 10 about the X-axis.

Figure 3A:
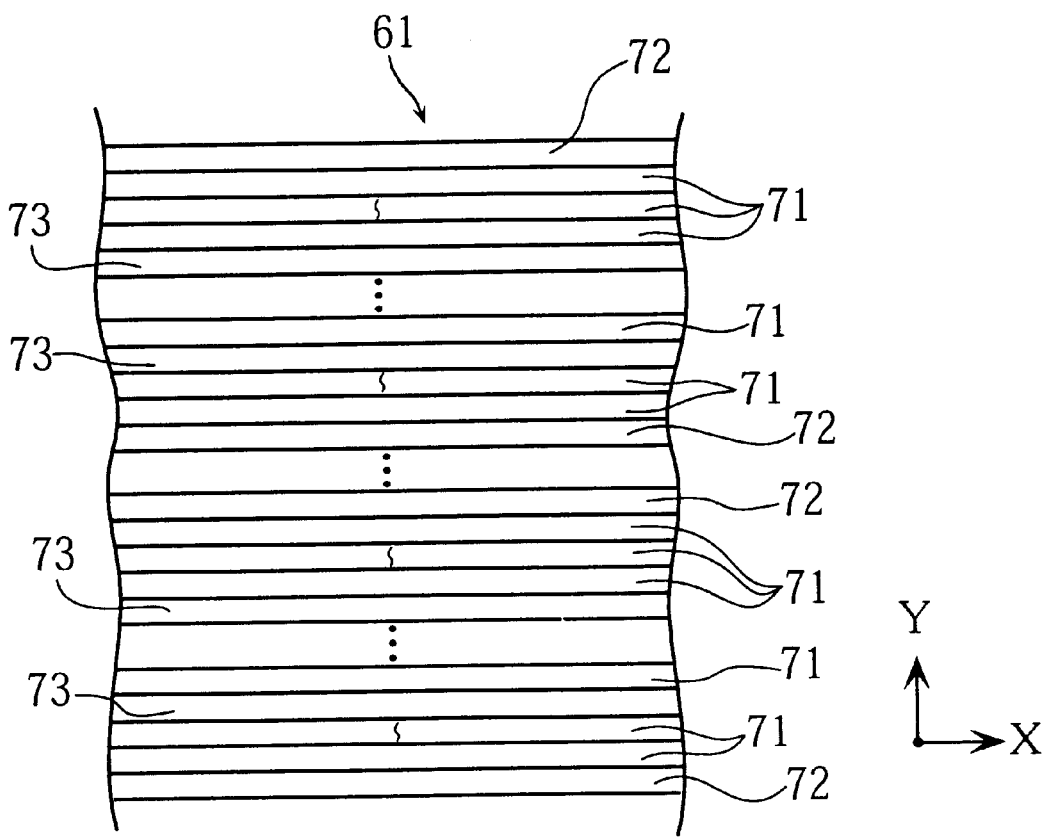
FIG. 3A illustrates the track structure of a magnetic tape used for the tape unit.

FIG. 3A schematically shows the track construction of the magnetic tape 61. As illustrated, the magnetic tape 61 is provided with a plurality of user data tracks 71, servo tracks 72 and tape positioning tracks 73. The user data tracks 71 are user-accessible tracks into which the user can write data. In the preferred embodiment, 128 user data tracks are provided. The servo tracks 72 hold servo data, while the tape positioning tracks 73 hold tracking control data.

The magnetic-head 10 is arranged to simultaneously access a plurality of user data tracks 71, servo tracks 72 and tape positioning tracks 73, though it is not possible for the magnetic head 10 to access all of the tracks 71–73 at once. Thus, the magnetic head 10 needs to be moved in the Y-direction or its opposite direction by the head position adjusting device 64 to access desired user data tracks 71.

Figure 3B:
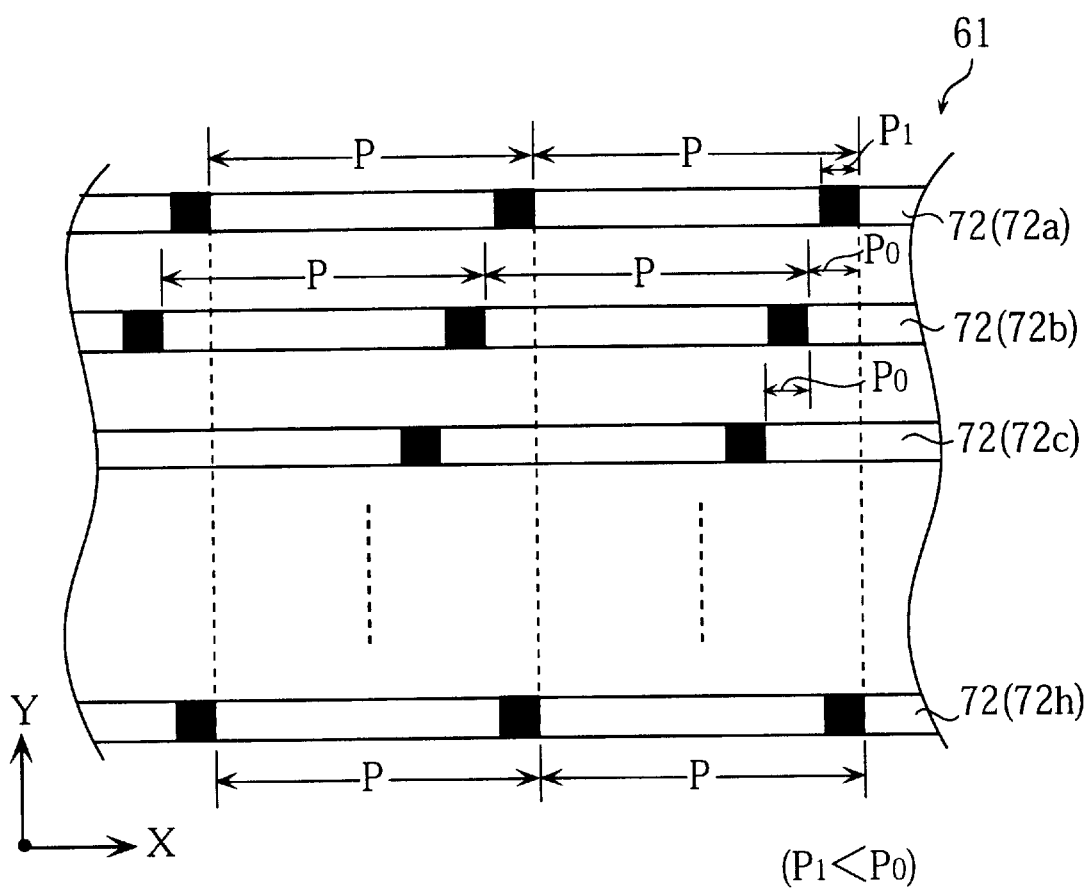
FIG. 3B illustrates an example of data arrangement on servo tracks of the magnetic tape.

Each of the servo tracks 72 is provided with servo data stored in a plurality of servo tracks. FIG. 3B, depicting only some of all the servo tracks 72 on the tape, illustrates this situation. Specifically, each servo track 72 (72a–72h) is provided with multiple pieces of servo data (blackened regions) disposed by a predetermined pitch (P) in the X-direction. Each piece of servo data may have a predetermined data length of P1. As illustrated, every two adjacent servo tracks 72 (the adjacent tracks 72a and 72b, 72b and 72c, and so on) are different in servo data phase by a predetermined pitch (P0) in the X-direction, which is greater than the data length P1. The servo data phases of the upper servo track 72a and the lower servo track 72h are arranged to coincide with each other. It should be noted here that the upper and the lower servo tracks 72a, 72h are the most spaced servo tracks that the magnetic head 10 can access simultaneously. Though not illustrated, the same servo track pattern shown in FIG. 3B will appear, as viewed in the widthwise direction of the tape 61 (the Y-direction).

The operation of the magnetic tape unit of the present invention will be described below.

Figure 4:
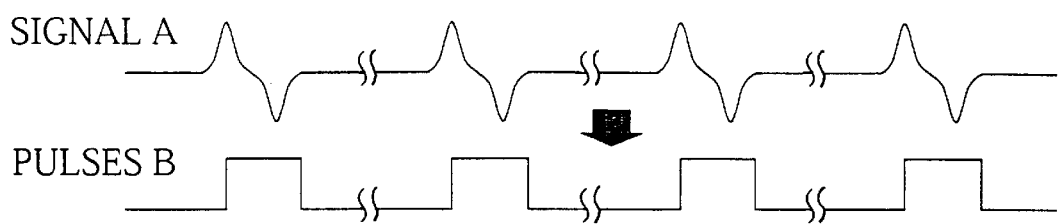
FIG. 4 illustrates the waveform of a signal supplied from the magnetic head.

First, the head position adjusting device 64 may be operated to move the magnetic head 10 in the Y-direction or the opposite direction, so that the head 10 will be brought to the desired position relative to the magnetic tape 61. Then, the tape 61 is begun to run, guided by the two tape guides 62, 63 (FIG. 2). Then, a series of read signals (A) as shown in FIG. 4 will be outputted from each of the magnetic head channels corresponding to the currently accessing servo tracks 72. Hereinafter, these channels of the magnetic head 10 may be called "servo track channels." The read signals (A) are then supplied to the read/write controller 3. The supplied read signals are converted into a series of pulses (B) as shown in FIG. 4 by the relevant one of the pulse converters 47 of the read signal pulse converting section 22.

Figure 5:
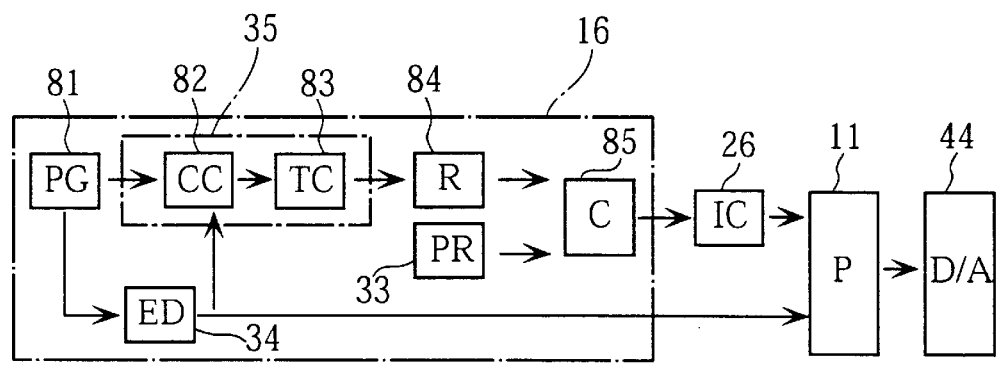
FIG. 5 is a block diagram illustrating the signal flow in performing skew compensation.

FIG. 5 shows the flow of signals for performing skew compensation. For convenience of description, it is supposed now that the magnetic head 10 is positioned to access the eight servo tracks 72a–72h shown in FIG. 3B.

In operation, as stated above, a series of read signals (A) (FIG. 4) is outputted from each of the servo track channels of the head 10 corresponding to the first through the eighth servo tracks 72a–72h, and then these read signals (A) are converted into a series of pulses (B) by the pulse converters 47. Specifically, a first series of read signals (A) obtained from the first servo track 72a is converted into a first series of pulses (B) by a first pulse converter 47, a second series of read signals (A) obtained from the second servo track 72b is converted into a second series of pulses (B) by a second pulse converter 47, and so on. Thus, eight series of pulses (B) are obtained.

Of all these series of pulses (B), only the first series of pulses (stemming from the first servo track 72a) and the eighth series of pulses (stemming from the eighth servo track 72h) are supplied from the read signal pulse converting section 22 to a pulse generator 81 of the X-direction head position compensating section 16.

Figure 6:
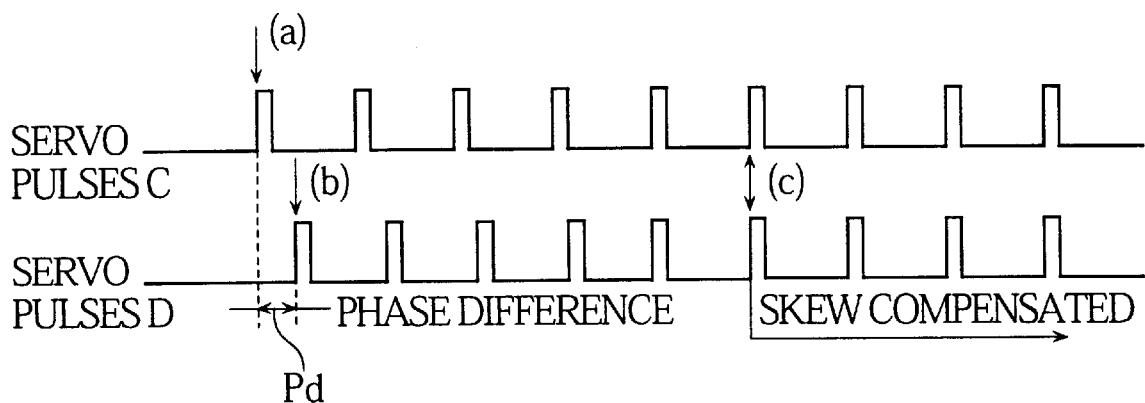
FIG. 6 illustrates a series of servo pulses converted from the read-out signal supplied by the magnetic head.

Referring now to FIG. 6, the pulse generator 81 may generate a first series of servo pulses (C) based on the above-mentioned first series of pulses (B), while also generating a second series of servo pulses (D) based on the above-mentioned eighth series of pulses (B). The first series of servo pulses (C) are synchronized with the rising edges of the first series of pulses (B), while the second series of servo pulses (D) are synchronized with the rising edges of the eighth series of pulses (B). Then, these servo pulses (C, D) are supplied to the edge detector 34 of the X-direction head position compensating section 16 (see FIG. 5).

The edge detector 34 will detect the rising edges of the servo pulses (C, D), and then supplies detection signals to a counter controller 82 of the interval determiner 35.

Figure 7:
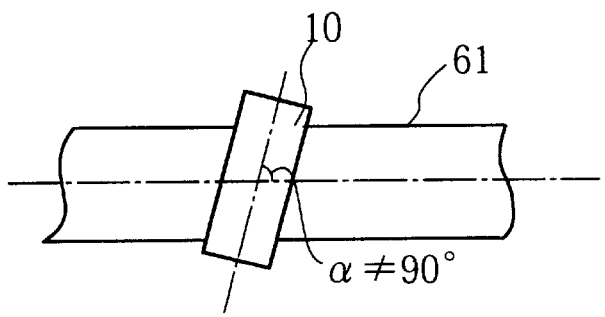
FIGS. 7 and 8 illustrate the skew compensation operation.

It is supposed that initially the magnetic head 10 is skewed relative to the magnetic tape 61, as shown in FIG. 7. In this condition, there is a phase difference (Pd) between the servo pulses (C) and the servo pulses (D), as shown in FIG. 6. For measuring the amount of this phase difference, the counter controller 82 starts an interval counter 83 of the interval determiner 35 when a rising edge of the servo pulses (C) is detected (see an arrow (a)). Then, the interval counter 83 counts the pulses of a clock signal having a sufficiently short cycle, until the counter 83 is stopped by the counter controller 82 when the subsequent rising edge of the servo pulses (D) is detected (see an arrow (b)). Then, the obtained count result is latched by a register 84.

Thereafter, a comparator 85 of the section 16 (see FIG. 5) compares the count number latched in the register 84 with a predetermined value which has been preset in the phase register 33 through the servo controlling processor 11. When the latched counter number is greater than the preset value in the register 33, the comparator 85 supplies a detection signal to the interrupt controller 26. Upon this, the interrupt controller 26 supplies an interrupt signal to the servo controlling processor 11, thereby causing the processor 11 to read out the counter number latched in the register 84.

Then, the processor 11 calculates how much and what direction the magnetic head 10 should be rotated about the Z-axis (FIG. 2) for compensating the skew. This calculation will be performed based on the above-mentioned counter number (read out from the register 84) and parameters such as the current running speed and running direction of the tape 61. The calculation will also be based on the belonging of the initially detected rising edge (a), in other words, on the fact about whether the initially detected rising edge (a) belongs to the first series of servo pulses (C) or the second series of servo pulses (D)). The calculation results are supplied to an A/D converter 44 of the motor current controlling section 19, as shown in FIG. 5.

Figure 8:
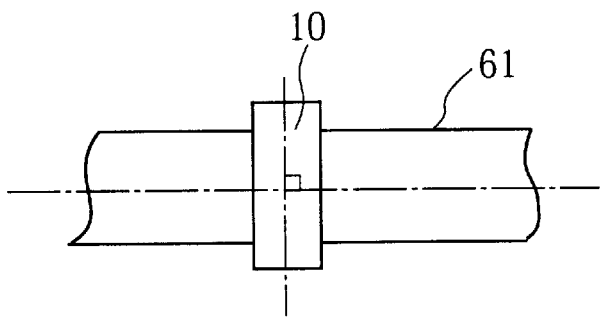

Accordingly, the A/D converter 44 supplies an appropriate current to the X-direction compensation motor 8 of the head position adjusting device 64 for skew compensation. Thus, the magnetic head 10 will be rotated about the Z-axis by the motor 8 to take the proper position relative to the tape 61, as shown in FIG. 8. At this stage, the phase difference (Pd) between the servo pulses C and D no longer exists, as shown by the double-headed arrow (c) in FIG. 6.

When the skew is not so large as to be detrimental to the proper function of the system, it may need not be compensated. Specifically, if a skew is greater than a predetermined threshold, it may need compensating. However, when the skew is no greater than the threshold, it may not be corrected. The threshold can be raised or lowered by varying the relevant value set in the phase register 33.

Due to the above-described skew compensating operation, the unfavorable "off-tracking" behavior of the magnetic head 10 is corrected, whereby the head 10 will be allowed to access the appropriate user data tracks 71 on the magnetic tape 61.

Figure 9:
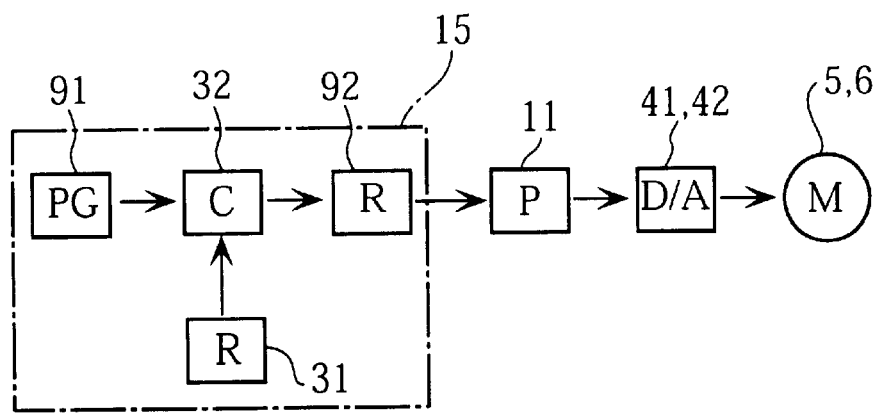
FIG. 9 is a block diagram showing the signal flow in performing tape speed compensation.

Reference is now made to FIG. 9 illustrating the signal flow in performing tape speed compensation. As previously stated with reference to FIG. 4, eight series of pulses (B) are generated when the magnetic head 10 is accessing the eight servo tracks 72a–72h (FIG. 3B).

Figure 10:
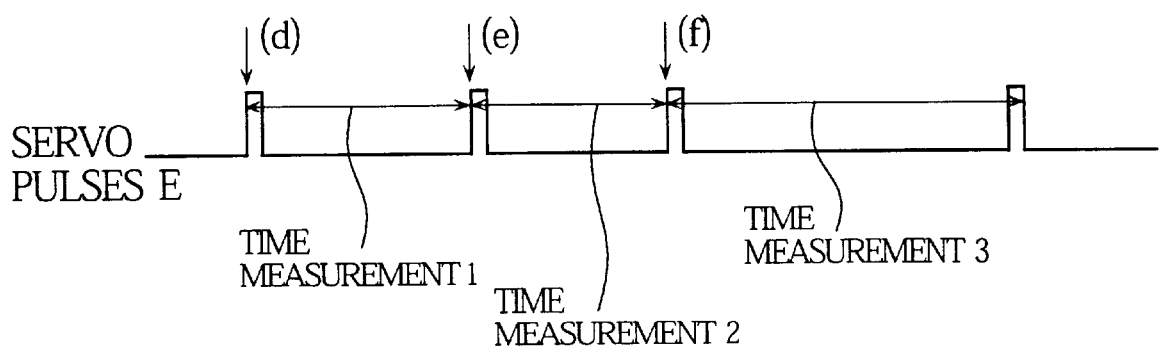
FIG. 10 illustrates a series of servo pulses obtained from a signal read out by the magnetic head.

Then, a selected one of the thus generated pulse series (B) is supplied to a pulse generator 91 of the tape speed measuring section 15. Upon receiving the pulses (B), the pulse generator 91 generates a series of servo pulses (E), as shown in FIG. 10, and then supplies these pulse series (E) to the tape speed detector 32.

The tape speed detector 32 includes a counter for counting the pulses of a clock signal having a sufficiently short cycle. This counter starts its counting operation at every rising edge of the servo pulse series (E). Specifically, the counter of the detector 32 starts its first counting (time-measuring) operation at the rising edge (d) shown in FIG. 10, and continues this until the next rising edge (e) is detected. The thus obtained count value is supplied to a register 92 of the section 15.

The counter will start a new counting operation at the second rising edge (e), the third rising edge (f), and so on. The count values obtained from the respective counting operations are supplied to the register 92. How many times such a counting operation will be repeated depends upon the preset value set in the speed register 31 under the control of the servo controlling processor 11.

Then, the servo controlling processor 11 reads out the count values latched in the register 11. Based on the readout data, the processor 11 analyzes the current running states of the tape 61, such as the running speed of the tape 61, the occurrence of tape slip. Then, in light of the results of this analysis, the processor 11 supplies appropriate driving data to the D/A converters 41, 42 of the motor current controlling section 19. As readily understood, the rising edges of the servo pulse series (E) will appear each time the magnetic tape 61 has been moved a constant distance. Thus, it is possible to calculate the running speed of the tape 61 by counting the clock signal pulses between two adjacent rising edges.

The D/A converters 41, 42 supply appropriate driving currents to the reel motors 5, 6 in accordance with drive data from the processor 11. Thus, the rotation speeds of the respective motors 5, 6 will be adjusted to equalize the running speed of the tape 61. Such an arrangement is helpful to prevent erroneous data-reading from occurring.

Next, the longitudinal positioning operation for the head 10 relative to the tape 61 will be described.

In operation, when the magnetic head 10 comes to the end of any piece of data read out from the tape 61, the main controller 1 supplies a GAPOUT signal to the servo controlling processor 11. Upon this, the processor 11 causes the tape position identifying section 18 to determine the current position of the tape 61, and this position is stored in the memory 12. Thus, a plurality of pieces of position data will be stored in the memory 12. Thereafter, when a particular one of the tape positions stored in the memory 12 is specified by the main controller 1, and the magnetic head 10 is brought to this particular position, then the processor 11 supplies a GAPIN signal to the main controller 1.

Figure 11:
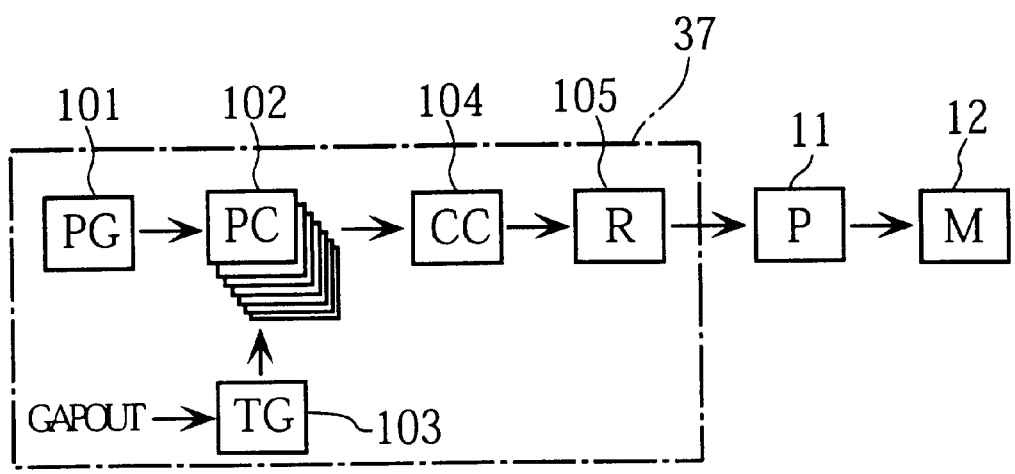
FIG. 11 is a block diagram showing the signal flow in performing the tape position recording operation.
Figure 12:
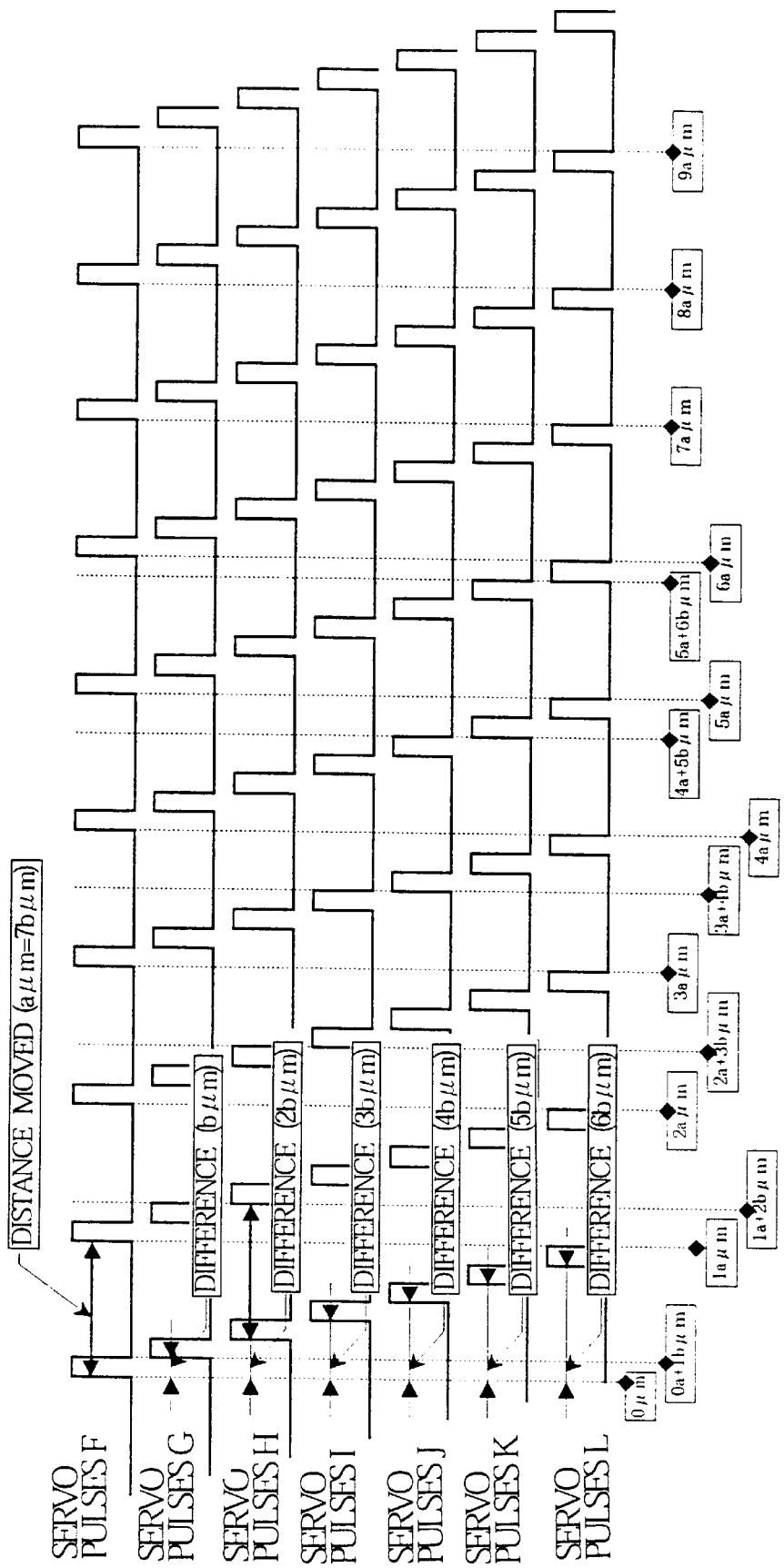
FIG. 12 illustrates a plurality of series of servo pulses obtained from different signals read out by the magnetic head.

Reference is now made to FIG. 11 which is a block diagram illustrating the signal flow during the tape position memorizing operation. After the pulse series (B) corresponding to the servo track channels of the head 10 have been generated by the pulse converters 47, they are supplied to a pulse generator 101 of the tape position memory 37 in the tape position identifying section 18. The pulse generator 101 will generate seven different series of servo pulses (F–L), as shown in FIG. 12, and then supply these servo pulse series (F–L) to tape position counters 102 (FIG. 11).

The tape position counters 102 count the pulses of the first through the seventh servo pulse series (F–L), respectively. Specifically, a first tape position counter 102 is responsible for counting the pulses of the first servo pulse series (F), a second tape position counter 102 is responsible for counting the pulses of the second servo pulse series (G), and so on.

Meanwhile, when the main controller 1 supplies a GAPOUT signal to the processor 11, the GAPOUT signal is then supplied to a data end position detector 103 from the processor 11. Upon this, the detector 103 supplies a detection signal to the tape position counters 102. Receiving the detection signal, the respective tape position counters 102 latch the obtained count numbers. These count numbers are then supplied to a count data comparator 104.

The comparator 104 detects the greatest count number of all the supplied count numbers. Then, the greatest count number and the track number of the servo track 72 corresponding to the counter 102 which has registered the greatest counter number will be held by a register 105. Then, the processor 11 causes the greatest count number and the track number to be stored in the memory 12.

In this connection, if two or more counters 102 have registered the greatest count number, the track number to be stored in the register 105 may be determined in the following manner. It is supposed that three counters 102 (e.g. the first, second and third counters) have registered the greatest count number. Then, the third counter 102 will be selected, since it is responsible for counting the pulses of the third servo pulse series (H) whose phase is slower than those of the other two servo pulse series (F, G). The third counter 102 corresponds to the third servo track 72c (FIG. 3B). Thus, the track number of the servo track 72c will be stored in the register 105, together with the greatest count number.

Figure 13:
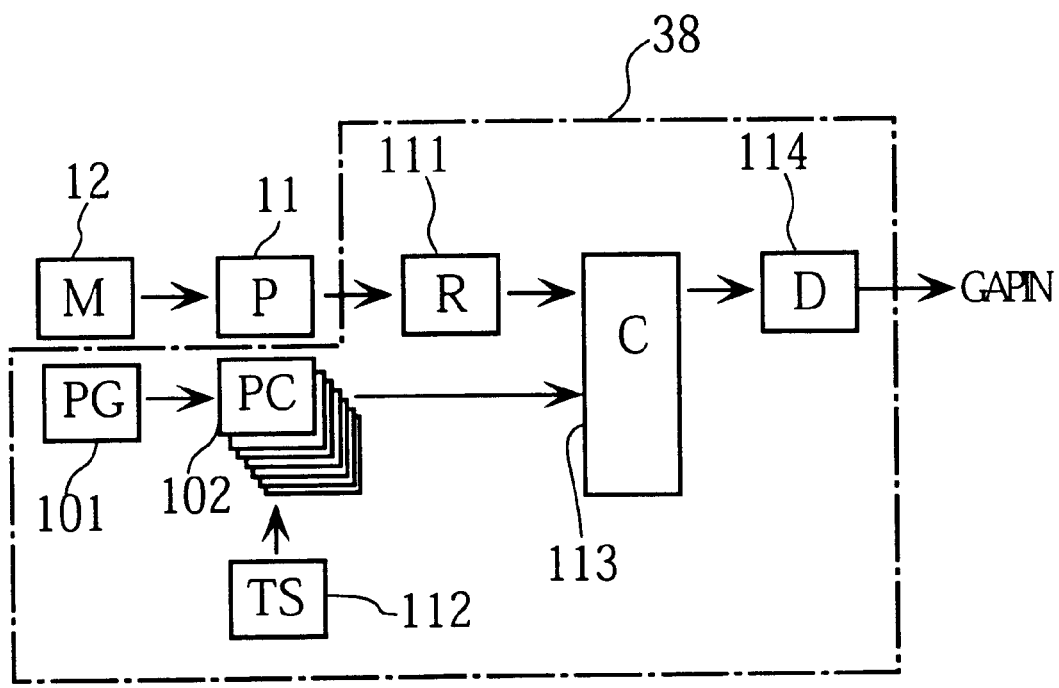
FIG. 13 is a block diagram showing the signal flow in performing the tape position determining operation.

Reference is now made to FIG. 13 which is a block diagram showing the signal flow during a tape position seeking operation. When a particular tape position is specified by the main controller 1, the servo controlling processor 11 reads out, from the memory 12, the relevant count number and track number corresponding to the specified tape position. Then, the processor 11 sets the count number in a position seeking register 111 of the tape position finder 38, while also setting the track number in a track selector 112. Then, the position seeking register 111 supplies the set value to a tape position monitor 113. The track selector 112 supplies a designation signal to the tape position counters 102 for specifying the counter corresponding to the selected track number. Upon this, the tape position counters 102 supply the count value of the counter specified by the track selector 112 to the tape position monitor 113.

As the magnetic tape 61 is running, the tape position counters 102 count the pulses of the respective servo pulse series (F–L) supplied from the pulse generator 101. The tape position monitor 113 compares the count number of the particular counter specified by the track selector 112 with the set value in the position seeking register 111. When the count number of the specified counter becomes equal to the set value in the register 111, the tape position monitor 113 supplies a coincidence signal to a GAPIN signal generator 114. Upon this, the generator 114 supplies a GAPIN signal to the servo controlling processor 11. Then, the processor 11 supplies a GAPIN signal to the main controller 1.

According to the above preferred embodiment, the longitudinal positioning for the magnetic head 10 relative to the tape 61 is performed based on the absolute positions marked on the tape 61. In this manner, it is possible to eliminate or at least mitigate the problem of erroneous positioning due to e.g. the slippage between the tape 61 and the tape guides 62, 63.

Figure 14:
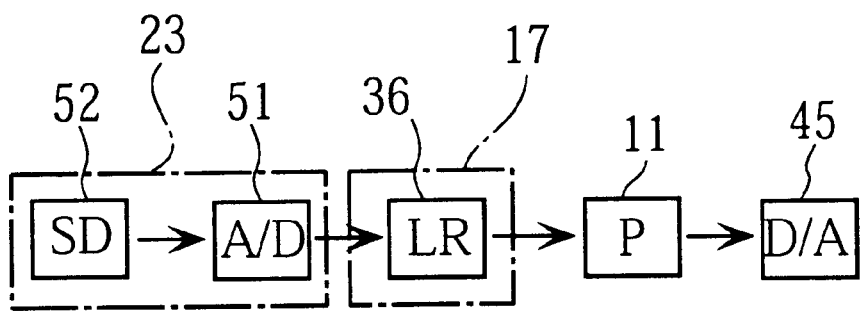
FIG. 14 is a block diagram showing the signal flow in performing the facing relation compensation between the magnetic head and the magnetic tape.

Reference is now made to FIG. 14 which is a block diagram showing the signal flow during a facing relation compensating operation for the tape 61 and the magnetic head 10. It is supposed again that the magnetic head 10 is positioned over the tape 61 to access the eight servo tracks 72a–72h (see FIG. 3B). For performing the desired compensation, use is made of two read signals M and N, as shown in FIG. 15, which are stemming from the first and the eighth servo tracks 72a, 72h (FIG. 3B), respectively.

Specifically, the servo wave-form amplitude monitors 52 (only one is shown in FIG. 14) of the Z-direction head position compensating section 23 are arranged to sample the amplitude of the read signals M and N. Then, these monitors 52 supply the peak values of the sampled data to the A/D converter 51. The A/D converter 51 converts the supplied peak values into digital data which will be sent to the level register 36 of the Z-direction position compensating section 17. The level register 36 is timed to latch the supplied digital data.

Based on the latched digital data, the servo controlling processor 11 analyzes the facing relation between the magnetic head 10 and the magnetic tape 61. In accordance with the results obtained from this analysis, the processor 11 supplies appropriate drive data to the D/A converter 45. Then, based on the drive data, the converter 45 supplies driving current to the Z-direction compensation motor 9. Upon this, the motor 9 is actuated to rotate the magnetic head 10 about the X-axis, so that the contact surface of the head 10 will be brought into parallel facing relation to the tape 61.

Figure 15:
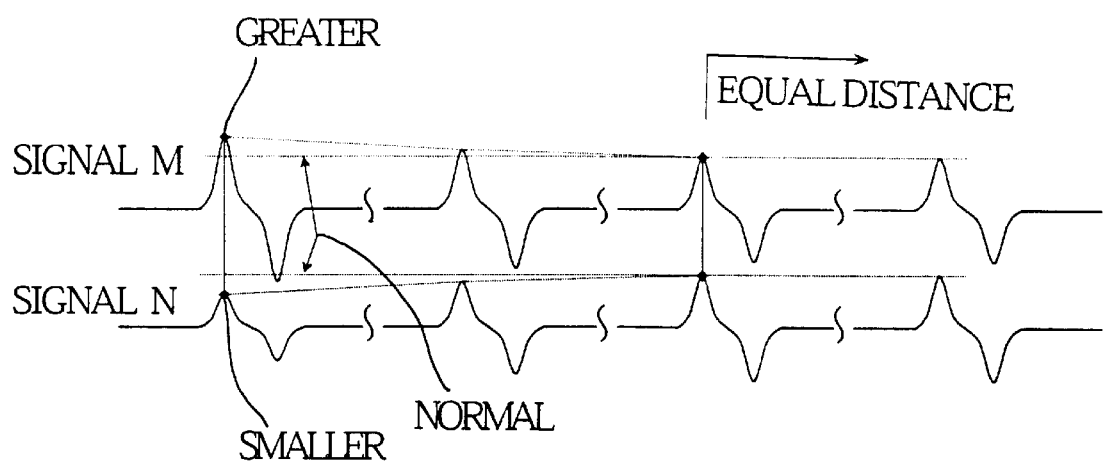
FIG. 15 illustrates how two particular read-out signals change their waveforms during the facing relation compensation.
Figure 16:
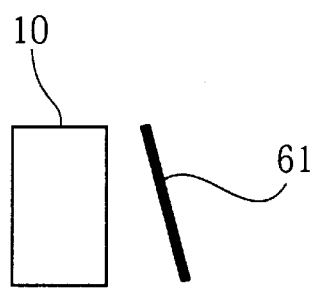
FIGS. 16 and 17 illustrate the change in posture of the magnetic head relative to the magnetic tape during the facing relation compensation.
Figure 17:
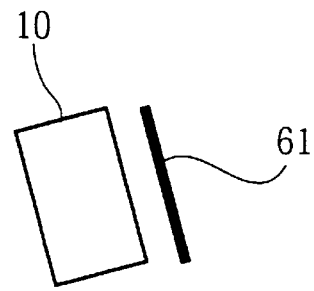

More specifically, when the magnetic head 10 is held in improper facing relation to the tape 61, as shown in FIG. 16, the peak value of the read signal M and the peak value of the other read signal N are different from each other, as shown in FIG. 15. In the figure, the peak value of the signal M is greater than the normal value (normal amplitude), while the peak value of the signal N is smaller than the same normal value. In accordance with the difference between these two peak values, the processor 11 supplies drive data to the converter 45, which in turn supplies driving current to the Z-direction compensation motor 9, to equalize the distance between the head 10 and the tape 61, as viewed in the widthwise direction of the tape 61 (FIG. 17). In this equalized condition, the peak value of the signal M coincides with the peak value of the other signal N, as shown in FIG. 15.

With the magnetic head 10 held in proper facing relation to the recording surface of the tape 61, it is possible to reduce or even eliminate fluctuations in read-out signal level.

The gist of the magnetic tape unit according to the above-described preferred embodiment may be grasped as follows.

Specifically, a magnetic tape unit of the present invention may include magnetic tape, a magnetic head, a skew detector and a skew compensator.

The magnetic tape is provided with a plurality of tracks including first and second servo control tracks.

The magnetic head is arranged to simultaneously access a predetermined number of tracks for data-writing and data-reading. Each of the first and the second servo control tracks is provided with identical pieces of data spaced from each other in the longitudinal direction of the magnetic tape. The pieces of data on the first servo control track are aligned with the pieces of data on the second servo control track as viewed in the widthwise direction of the magnetic tape.

The skew detector detects a skew of the magnetic head relative to the magnetic tape based on a phase difference between first and second signals stemming from the first and the second servo control tracks, respectively.

The skew compensator rotates the magnetic head about a normal axis perpendicular to the recording surface of the magnetic tape based on the skew detected by the skew detector, so that the skew will be eliminated.

Further, a magnetic tape unit of the present invention may include a magnetic tape, a magnetic head and a tape speed determiner.

The magnetic tape is provided with a plurality of tracks including a servo control track. This servo control track is provided with pieces of data spaced from each other in the longitudinal direction of the magnetic tape.

The magnetic head is arranged to simultaneously access a predetermined number of tracks for data-writing and data-reading.

The tape speed determiner determines the running speed of the magnetic tape based on the cycle of signals stemming from the servo control track.

Further, a magnetic tape unit of the present invention may include a magnetic tape, a magnetic head, a tape speed determiner and a tape speed compensator. As in the above-mentioned tape unit, the magnetic tape is provided with a plurality of tracks including a servo control track. This servo control track is provided with pieces of data spaced from each other in the longitudinal direction of the magnetic tape. The magnetic head is arranged to simultaneously access a predetermined number of tracks for data-writing and data-reading. The tape speed determiner determines the running speed of the magnetic tape based on the cycle of signals stemming from the servo control track.

The tape speed compensator adjusts the running speed of the magnetic tape based on the current tape speed detected by the tape speed determiner.

Further, a magnetic tape unit of the present invention may include a magnetic tape, a magnetic head and a tape position determiner.

The magnetic tape is provided with tracks including a plurality of servo control tracks. Each of the servo control tracks is provided with pieces of data spaced from each other in the longitudinal direction of the magnetic tape. The pieces of data on the respective servo control tracks are different in phase.

The magnetic head is arranged to simultaneously access a predetermined number of tracks for data-writing and data-reading. The magnetic head reads out data from the respective servo control tracks and outputs corresponding signals.

The tape position determiner performs counting on the signals outputted from the magnetic head. Specifically, the tape position determiner may count the pulses of each signal supplied from the magnetic head. Then, the tape position determiner determines the greatest count number, and identifies the particular one (or ones) of the servo control tracks which is associated with the greatest count number. If there are two or more servo control tracks associated with the greatest count number, the tape position determiner selects one track from which an output signal having the latest pulse phase is obtained. Through these steps, the tape position determiner determines the current position of the magnetic head relative to the magnetic tape as viewed longitudinally of the tape.

Further, a magnetic tape unit of the present invention may include a magnetic tape, a magnetic head, a facing relation detector and a facing relation compensator.

The magnetic tape is provided with a plurality of tracks including first and second servo control tracks. Each of the servo control tracks is provided with identical pieces of data spaced from each other in the longitudinal direction of the magnetic tape. The pieces of data on the first servo control track are arranged to coincide with the pieces of data on the second servo control track, as viewed in the widthwise direction of the magnetic tape.

The magnetic head is arranged to simultaneously access a predetermined number of tracks for data-writing and data-reading.

The facing relation detector determines whether or not the magnetic head is held in parallel facing relation to the magnetic tape, based on the difference in amplitude between first and second signals read out from the first and the second servo control tracks, respectively.

The facing relation compensator rotates the magnetic head about an axis extending in the longitudinal direction of the magnetic tape, based on the facing relation (between the head and the tape) detected by the facing relation detector. Thus, the magnetic head will be brought into proper facing relation to the magnetic tape.

Figure 18:
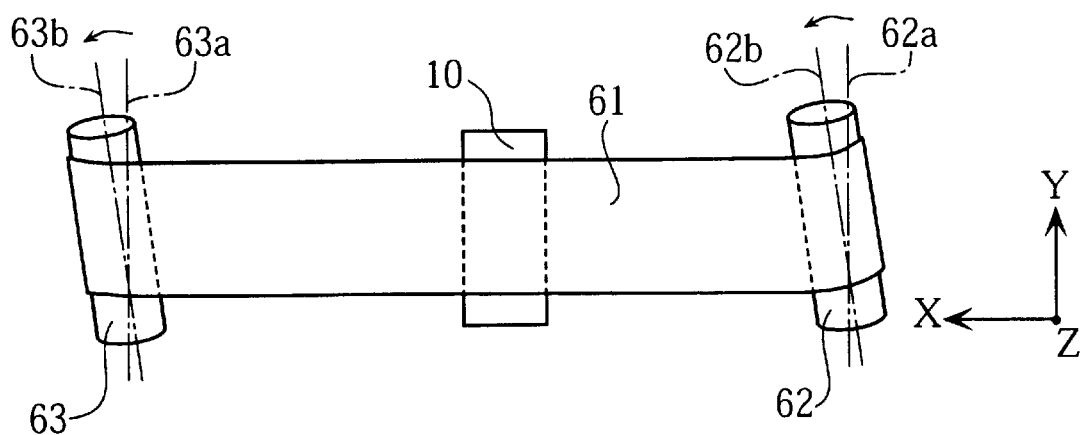
FIG. 18 illustrates a different method for skew compensation.

In the preferred embodiment described above, the skew compensation is performed by rotating the magnetic head about the predetermined axis with respect to the magnetic tape 61, though the present invention is not limited to this. Referring to FIG. 18, according to a second embodiment of the present invention, the magnetic tape 61 may be moved relative to the magnetic head 10 for compensating the skew. Specifically, it is supposed that the tape 61 is skewed relative to the magnetic head 10 when the rotation axes of the respective tape guides 62, 63 coincide with the single-dot chain lines 62a, 63a. In such an instance, the tape guides 62, 63 may be rotated about Z-direction axes by the X-direction compensation motor 8, so that the rotation axes of the tape guides 62, 63 will coincide with the other single-dot chain lines 62b and 63b, as shown in FIG. 18. In this manner, the skew can be eliminated.

Thus, according to the present invention, a magnetic tape unit may be provided which includes a magnetic tape, a magnetic head, tape guiding means, a skew detector and a skew compensator. The tape guiding means may consist of two guide rollers.

The magnetic tape is provided with a plurality of tracks including first and second servo control tracks. Each of the first and the second servo control tracks is provided with pieces of data spaced from each other in the longitudinal direction of the magnetic tape. The pieces of data on the first servo control track are aligned with the pieces of data on the second servo control track, as viewed in the widthwise direction of the magnetic tape.

The magnetic head is arranged to simultaneously access a predetermined number of tracks for data-writing and data-reading.

Tape guiding means is arranged adjacent to the magnetic head for guiding the magnetic tape so that the tape is held in facing relation to the magnetic head.

The skew detector detects a skew of the magnetic tape relative to the magnetic head based on a phase difference between first and second signals stemming from the first and the second servo control tracks, respectively.

For compensating the skew, the skew compensator rotates the guiding means about a normal axis perpendicular to the recording surface of the magnetic tape, based on the skew detected by the skew detector.

Figure 19:
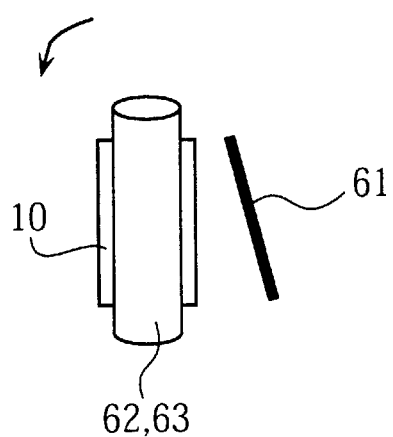
FIG. 19 illustrates a different method for facing relation compensation.

Further, in the above-described preferred embodiment of the present invention, the magnetic head 10 is rotated about the X-direction axis, so that the head 10 will be brought into parallel facing relation to the magnetic tape 61. Instead, referring to FIG. 19, the tape guides 62, 63 may be rotated about an X-axis by the Z-direction compensation motor 9.

In accordance with the above idea, there may be provided a magnetic tape unit which includes a magnetic tape, a magnetic head, tape guiding means, a facing relation detector and a facing relation compensator.

The magnetic tape is provided with a plurality of tracks including first and second servo control tracks. Each of the servo control tracks is provided with identical pieces of data spaced from each other in the longitudinal direction of the magnetic tape. The pieces of data on the first servo control track are arranged to coincide with the pieces of data on the second servo control track, as viewed in the widthwise direction of the magnetic tape.

The magnetic head is arranged to simultaneously access a predetermined number of tracks for data-writing and data-reading.

The facing relation detector determines whether or not the magnetic head is held in parallel facing relation to the magnetic tape, based on the difference in amplitude between first and second signals read out from the first and the second servo control tracks, respectively.

The facing relation compensator rotates the guiding means about an axis extending in the longitudinal direction of the magnetic tape, based on the facing relation (between the head and the tape) detected by the facing relation detector. Thus, the magnetic head will be brought into proper facing relation to the magnetic tape.

Further, in the above-described preferred embodiment of the present invention, a predetermined number of servo tracks 72 are provided with pieces of data spaced from each other in the longitudinal direction of the tape 61, wherein the pieces of data on the respective servo tracks are different in phase (see FIG. 3B). With the use of such magnetic tape, the longitudinal positioning of the magnetic head 10 relative to the tape 61 can be accurately performed, as stated above.

However, according to the present invention, use may be made of only one servo track 72 provided with pieces of data for performing the longitudinal positioning of the magnetic head 10 over the tape 61. In this case again, the desired longitudinal positioning of the head 10 may be achieved by counting the pulses of the signal read out from the single servo track 72.

Alternatively, use may be made of several servo tracks 72 each of which is provided with pieces of data for performing the longitudinal positioning of the magnetic head relative to the magnetic tape. In this case, the pieces of data on the respective servo tracks 72 are arranged in the same phase, as opposed to the example shown in FIG. 3B. With such an arrangement, any one of the servo tracks 72 can be used for finding the current longitudinal position of the head 10 over the tape 61. Thus, the tape position finding operation can be performed more reliably than when only one servo track 72 is used.

In accordance with the above idea, there may be provided a magnetic tape unit which includes a magnetic tape, a magnetic head and a tape position determiner.

The magnetic tape is provided with tracks including a predetermined number of servo control tracks. Each of the servo control tracks is provided with pieces of data spaced from each other in the longitudinal direction of the magnetic tape. Instead of providing more than one servo control track, a single servo control track may suffice for performing the desired positioning of the magnetic head.

The magnetic head is arranged to simultaneously access a predetermined number of tracks for data-writing and data-reading. The magnetic head reads out data from the respective servo control tracks and outputs corresponding signals.

The tape position determiner performs counting on the signals outputted from the magnetic head. Specifically, the tape position determiner may count the pulses of the signals from the magnetic head. Through this counting operation, the tape position determiner determines the current position of the magnetic head relative to the magnetic tape as viewed longitudinally of the tape.

Figure 20:
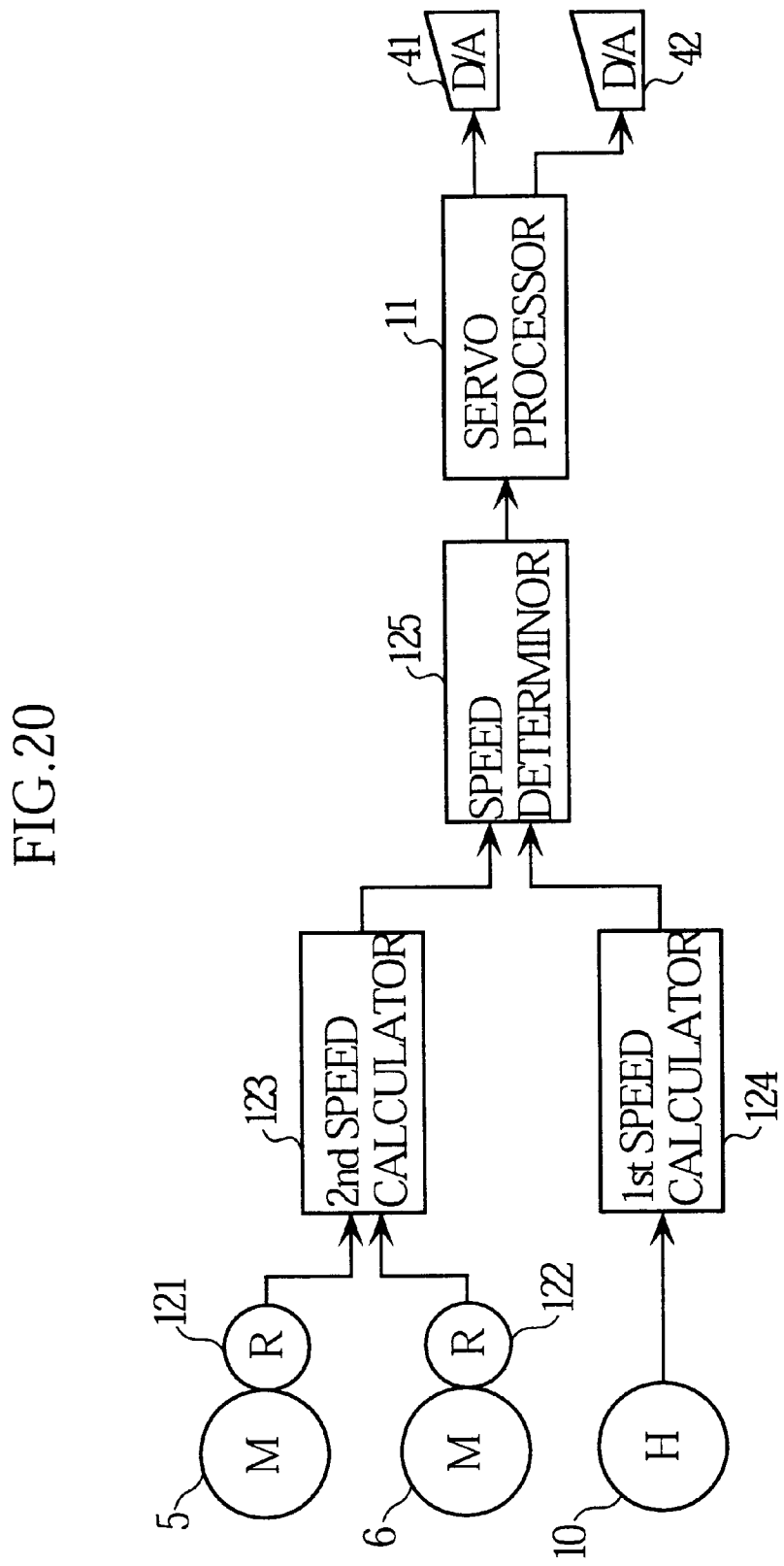
FIG. 20 is a block diagram showing the signal flow in performing the tape speed compensation according to a different embodiment of the present invention.

A magnetic tape unit of the present invention may be additionally provided with a conventional tape-speed and tape-position determining technique. Specifically, as shown in FIG. 20, use may be made of rotary encoders 121 and 122 for counting the revolutions of the reel motors 5 and 6, respectively. In this case, the magnetic tape unit further includes a second tape speed detector 123, in addition to a first tape speed detector 124 associated with the magnetic head 10. The second tape speed detector 123 calculates the running speed of the magnetic tape based on the detection signals supplied from the rotary encoders 121, 122. The first tape speed detector 124 calculates the running speed of the tape based on the signals supplied from the magnetic head 10. The results of the calculation at the first and the second detectors are sent to a tape speed determiner 125. This determiner 125 chooses one of the calculated speeds from the first and the second tape speed detectors 123, 124. The selected tape speed is then supplied to the servo controlling processor 11. Based on the tape speed data, the processor 11 controls the operation of the reel motors 5, 6 via the D/A converters 41, 42.

Figure 21:
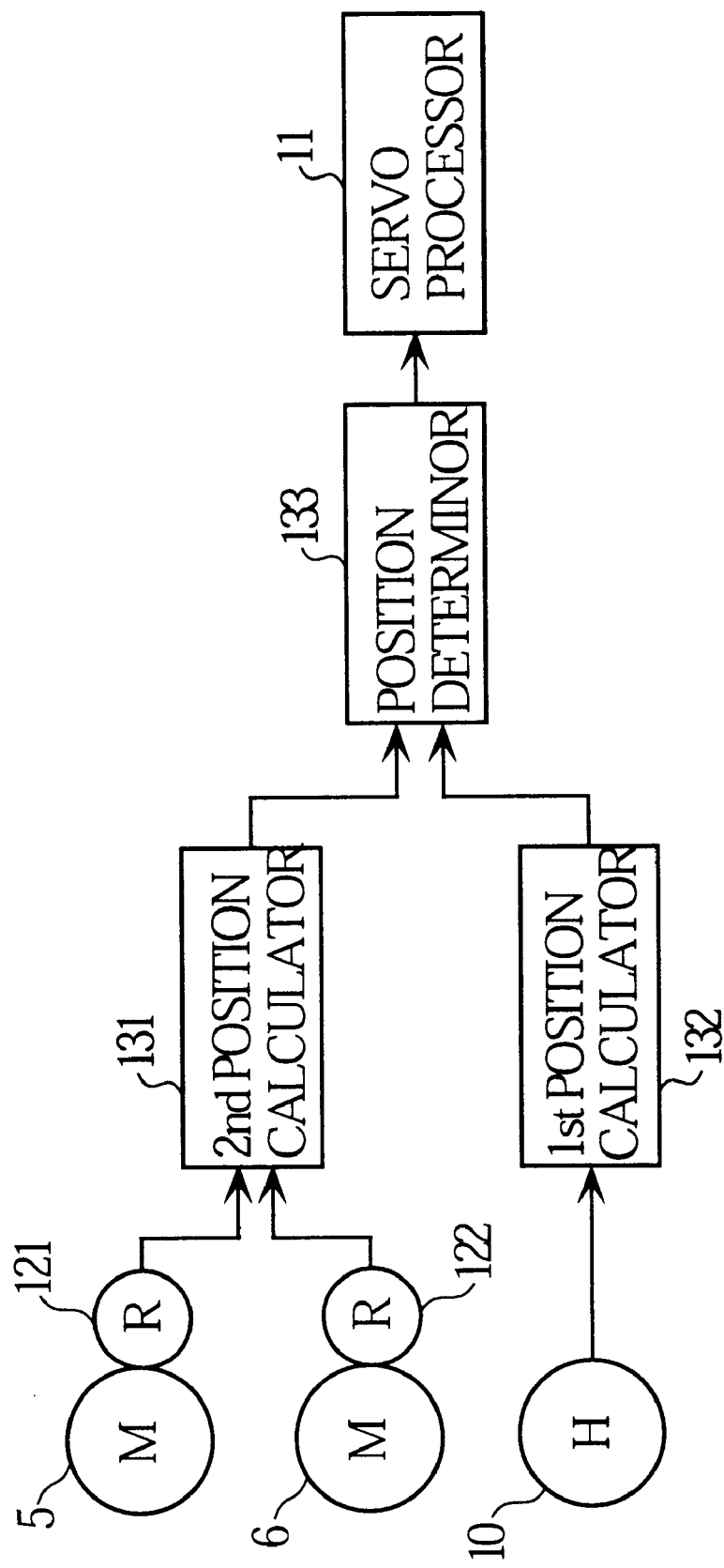
FIG. 21 is a block diagram showing the signal flow in performing the tape position determining operation according to a different embodiment of the present invention.

According to another embodiment of the present invention, as shown in FIG. 21, a second tape position detector 131 may be used in association with the first and the second rotary encoders 121, 122. Besides the second detector 131, a first tape position detector 132 is provided for calculating the longitudinal running position of the tape 61 based on the signal outputted from the magnetic head 10. The second tape position detector 131 calculates the tape position based on the detection signals from the two encoders 121, 122. The results of the calculation at the first and the second tape position detectors 131, 132 are sent to a tape position determiner 133. This determiner 133 chooses one of the calculated tape positions. The selected data is then supplied to the servo controlling processor 11.

To provide the above-described additional detector for tape speed or tape position is advantageous in the following points.

As previously stated, the problem of erroneous tape speed detection or tape position detection due to e.g. tape slippage can be eliminated by performing the necessary calculations based on the signals outputted from the magnetic head 10. With this technique, however, there is still a possibility of erroneous detection, which may be caused when a signal read out from the tape 61 is lost or when the signal reading operation fails to be performed properly. This problem can be dealt with by providing the above-mentioned additional tape speed or position detector. Specifically, even when the main detecting means based on the signals read out by the head 10 is not effective for performing the proper speed or position detecting operation, the detecting operation will be performed by the additional detecting means including the rotary encoders 121 and 122, the second tape speed or position detector 123 or 131, and the tape speed or position determiner 125 or 133.

In accordance with the above idea, there may be provided a magnetic tape unit which includes a magnetic tape, a magnetic head, a first speed calculator, a rotation counter, a second speed calculator and a speed determiner. The magnetic tape is provided with a plurality of tracks including a servo control track which is provided with pieces of data spaced from each other in the longitudinal direction of the magnetic tape. The magnetic head is arranged to simultaneously access a plurality of tracks for data-writing and data-reading.

The first speed calculator calculates a first running speed of the magnetic tape, based on the cycle of a signal read out from the servo control track.

The rotation counter counts the number of revolutions of a reel motor for running the magnetic tape.

The second speed calculator calculates a second running speed of the magnetic tape, based on the number of revolutions counted by the rotation counter.

The speed determiner determines the current running speed of the magnetic tape, based on the first and the second running-speeds of the magnetic tape.

Further, there may be provided a magnetic tape unit which includes a magnetic tape, a magnetic head, a first position calculator, a rotation counter, a second position calculator and a tape position determiner. The magnetic tape is provided with a plurality of tracks including a servo control track which is provided with pieces of data spaced from each other in the longitudinal direction of the magnetic tape. The magnetic head is arranged to simultaneously access a plurality of tracks for data-writing and data-reading.

The first position calculator calculates a first running position of the magnetic tape by counting a signal read out from the servo control track.

The rotation counter counts the number of revolutions of a reel motor for running the magnetic tape.

The second position calculator calculates a second running position of the magnetic tape, based on the number of revolutions counted by the rotation counter.

The tape position determiner determines the current running position of the magnetic tape, based on the first and the second running positions.

According to the present invention, the first tape position detector 132 (see FIG. 21) may calculate the running position of the magnetic tape, based on one of the signals read out from such a plurality of servo control tracks as shown in FIG. 3B.

In accordance with the above idea, there may be provided a magnetic tape unit which includes a magnetic tape, a magnetic head, a first position calculator, a rotation counter, a second position calculator and a tape position determiner.

The magnetic tape is provided with tracks including a plurality of servo control tracks. Each of the servo control tracks is provided with pieces of data spaced from each other in the longitudinal direction of the magnetic tape. The pieces of data on the respective servo control tracks are different in phase. The magnetic head is arranged to simultaneously access a plurality of tracks for data-writing and data-reading.

The first position calculator calculates a first longitudinal position of the magnetic head relative to the magnetic tape by performing counting on signals read out from the respective servo control tracks, and by finding a particular one of the servo control tracks, wherein the signal read out from this particular servo control track has the greatest count number and the latest phase.

The rotation counter counts the number of revolutions of a reel motor for moving the magnetic tape.

The second position calculator calculates a second longitudinal position of the magnetic head relative to the magnetic tape, based on the number of revolutions counted by the rotation counter.

The tape position determiner determines the current longitudinal position of the magnetic head relative to the magnetic tape, based on the first and the second longitudinal positions.

According to the present invention, only one servo control track may be provided on the magnetic tape, wherein the single servo control track is provided with pieces of data spaced from each other by predetermined distances. In accordance with this idea, there may be provided a magnetic tape unit which includes a magnetic tape, a magnetic head, a first position calculator, a rotation counter, a second position calculator and a tape position determiner.

The magnetic tape is provided with a plurality of tracks including a servo control track. This servo control track is provided with pieces of data spaced from each other in the longitudinal direction of the magnetic tape. The magnetic head is arranged to simultaneously access a plurality of tracks on the magnetic tape.

The first position calculator calculates a first longitudinal position of the magnetic head relative to the magnetic tape by performing counting on a signal read out from the servo control track.

The rotation counter counts the number of revolutions of a reel motor for running the magnetic tape.

The second position calculator calculates a second longitudinal position of the magnetic head relative to the magnetic tape, based on the number of revolutions counted by the rotation counter.

The tape position determiner determines the current running position of the magnetic tape with respect to the magnetic head, based on the first and the second longitudinal positions of the magnetic head.

In the above-described magnetic tape units, the longitudinal running position of the magnetic tape 61 is determined by counting the pulses of a pulse series converted from a signal (or signals) which is read out from a servo track 72 (or tracks 72) on the magnetic tape 61. The present invention, however, is not limited to this. For instance, servo tracks 72 may be provided with positioning codes arranged in the longitudinal direction of the magnetic tape. These positioning codes indicate the absolute positions of the magnetic tape. With such an arrangement, the current running position of the magnetic tape 61 can be determined by causing the magnetic head 10 to read out the positioning codes.

Such positioning codes may be provided in one servo track 72 only. Preferably, several servo tracks 72 may be provided with the positioning codes. With this arrangement, the running position of the magnetic tape 61 can be determined accurately even when one or two (or more) servo tracks 72 are provided with incomplete positioning codes.

According to the above idea, there may be provided a magnetic tape unit which includes a magnetic tape, a magnetic head and a tape position determiner.

The magnetic tape is provided with a plurality of tracks including a servo control track. This servo control track is provided with positioning data representing the absolute, longitudinal positions of the magnetic tape. The magnetic head is arranged to simultaneously access a plurality of tracks for data-writing and data-reading. The tape position determiner determines the current running position of the tape, based on information obtained by reading out the positioning data on the servo control track.

Further, there may be provided a magnetic tape unit which includes a magnetic tape, a magnetic head and a tape position determiner.

The magnetic tape is provided with tracks including a plurality of servo control tracks. The respective servo control tracks are provided with identical absolute position indicating codes. The absolute position indicating codes of the respective tracks have the same phase, as viewed in the widthwise direction of the magnetic tape. The magnetic head is arranged to simultaneously access a plurality of tracks on the magnetic tape. The tape position determiner determines the current running position of the magnetic tape, based on information obtained by reading out the absolute position indicating codes on one or more of the servo control tracks.

For performing more accurate running position determining, the absolute position indicating codes on the servo control tracks may be recorded in different phase, as with the pulse-generating data shown in FIG. 3B. With such an arrangement, the pitch P0 (see FIG. 3B) can be made smaller, without deteriorating the proper data-reading performance, than when the position indicating codes are crammed into only one servo control track. Clearly, the smaller pitch P0 of the codes makes it possible to determine the running position of the tape 61 more accurately.

In accordance with the above idea, there may be provided a magnetic tape unit which includes a magnetic tape, a magnetic head and a tape position determiner. The magnetic tape is provided with tracks including a plurality of servo control tracks each of which is provided with absolute position indicating codes spaced from each other in the longitudinal direction of the magnetic tape. The absolute position indicating codes on the respective servo control tracks are different in phase. The magnetic head is arranged to simultaneously access a plurality of tracks for data-writing and data-reading. The tape position determiner determines the current running position of the magnetic tape, based on information obtained by reading out the absolute position indicating codes of the servo control tracks.

According to the present invention, the above position-determining technique utilizing the absolute position indicating codes may be combined with the conventional position-determining method using rotary encoders.

Figure 22:
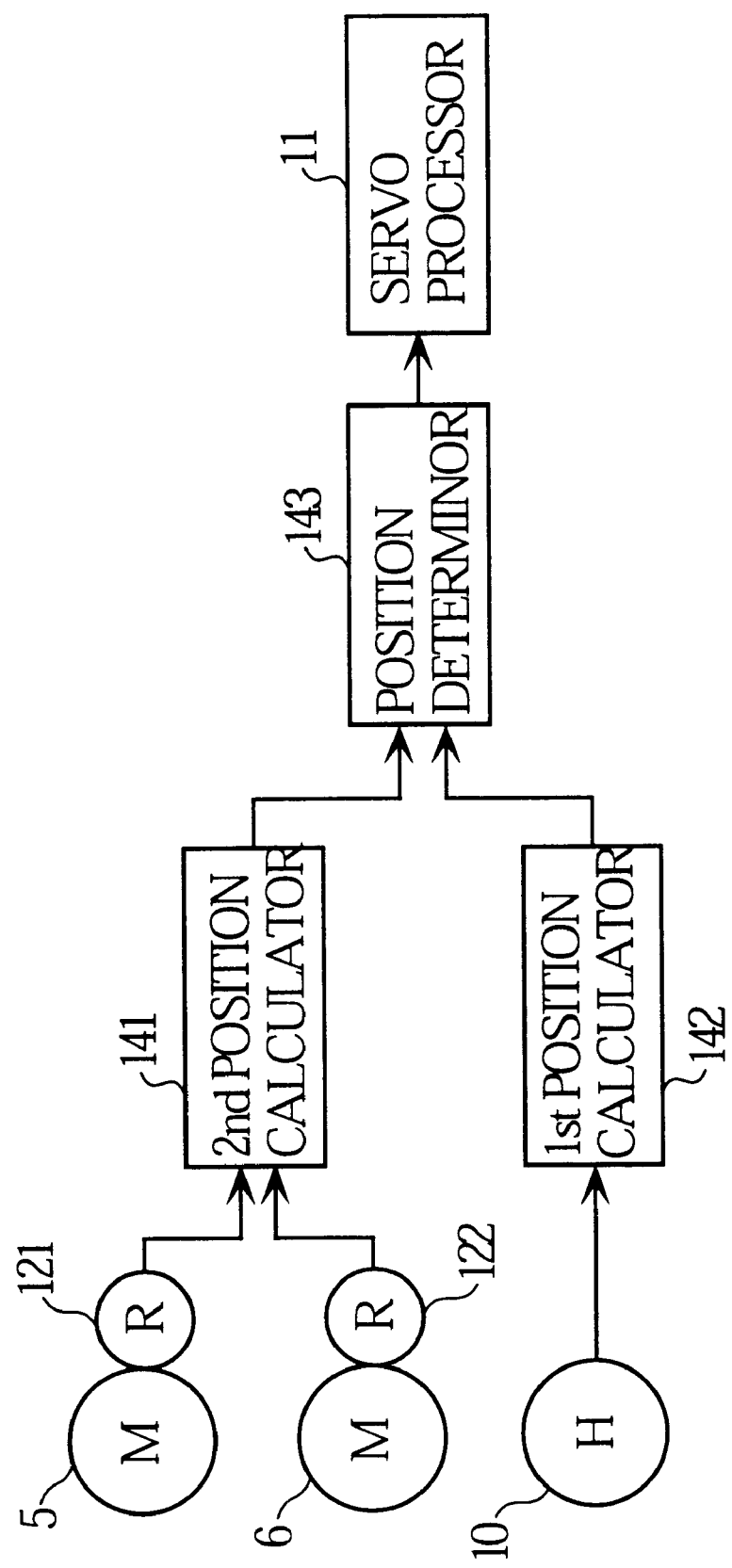
FIG. 22 is a block diagram showing the signal flow in performing the tape position determining operation according to another embodiment of the present invention.

Specifically, as shown in FIG. 22, rotary encoders 121, 122 are associated with the reel motors 5 and 6, respectively, for detecting the number of revolutions of these motors. Based on the detection signals supplied from the encoders 121, 122, a second tape position calculator 141 calculates the running position of the tape 61. The first tape position calculator 142 also calculates the running position of the tape 61 based on the signals supplied from the magnetic head 10. The results of the calculation at the first and the second calculators 141, 142 are supplied to a tape position determiner 143 for determining the current running position of the tape 61. The resulting data about the tape position is then supplied to the servo controlling processor 11.

In accordance with the above idea, there may be provided a magnetic tape unit which includes a magnetic tape, a magnetic head, a first position calculator, a rotation counter, a second position calculator, a tape position determiner. The magnetic tape is provided with a plurality of tracks including a servo control track. This servo control track is provided with absolute longitudinal position indicating codes spaced from each other in the longitudinal direction of the magnetic tape. The magnetic head is arranged to simultaneously access a plurality of tracks for data-writing and data-reading. The first position calculator calculates a first longitudinal position of the magnetic tape, based on information obtained by reading out the absolute longitudinal position indicating codes on the servo control track. The rotation counter counts the number of revolutions of a reel motor for running the magnetic tape. The second position calculator calculates a second longitudinal position of the magnetic tape, based on the number of revolutions counted by the rotation counter. The tape position determiner determines the current longitudinal position of the magnetic tape, based on the first and the second longitudinal positions of the magnetic tape.

Further, there may be provided a magnetic tape unit which includes a magnetic tape, a magnetic head, a first position calculator, a rotation counter, a second position calculator and a tape position determiner. The magnetic tape is provided with tracks including a plurality of servo control tracks. Each of the servo control tracks is provided with absolute longitudinal position indicating codes spaced from each other in the longitudinal direction of the magnetic tape. The position indicating codes on the respective servo control tracks have the same phase, as viewed in the longitudinal direction of the magnetic tape. The magnetic head is arranged to simultaneously access a plurality of tracks on the magnetic tape. The first position calculator calculates a first longitudinal position of the tape, based on information obtained by reading out the absolute longitudinal position indicating codes on the servo control tracks. The rotation counter counts the number of revolutions of a reel motor for running the magnetic tape. The second tape position calculator calculates a second longitudinal position of the tape, based on the number of revolutions counted by the rotation counter. The tape position determiner determines the current running position of the magnetic tape with respect to the magnetic head, based on the first and the second longitudinal positions of the tape.

Further, there may be provided a magnetic tape unit which includes a magnetic tape, a magnetic head, a first position calculator, a rotation counter, a second position calculator and a tape position determiner. The magnetic tape is provided with tracks including a plurality of servo control tracks. Each of the servo control tracks is provided with absolute longitudinal position indicating codes spaced from each other in the longitudinal direction of the magnetic tape. The position indicating codes on the respective servo control tracks are different in phase, as viewed in the longitudinal direction of the magnetic tape. The magnetic head is arranged to simultaneously access a plurality of tracks on the magnetic tape. The first position calculator calculates a first longitudinal position of the tape, based on information obtained by reading out the absolute longitudinal position indicating codes on the servo control tracks. The rotation counter counts the number of revolutions of a reel motor for running the magnetic tape. The second tape position calculator calculates a second longitudinal position of the tape, based on the number of revolutions counted by the rotation counter. The tape position determiner determines the current running position of the magnetic tape with respect to the magnetic head, based on the first and the second longitudinal positions of the tape.

Figure 23:
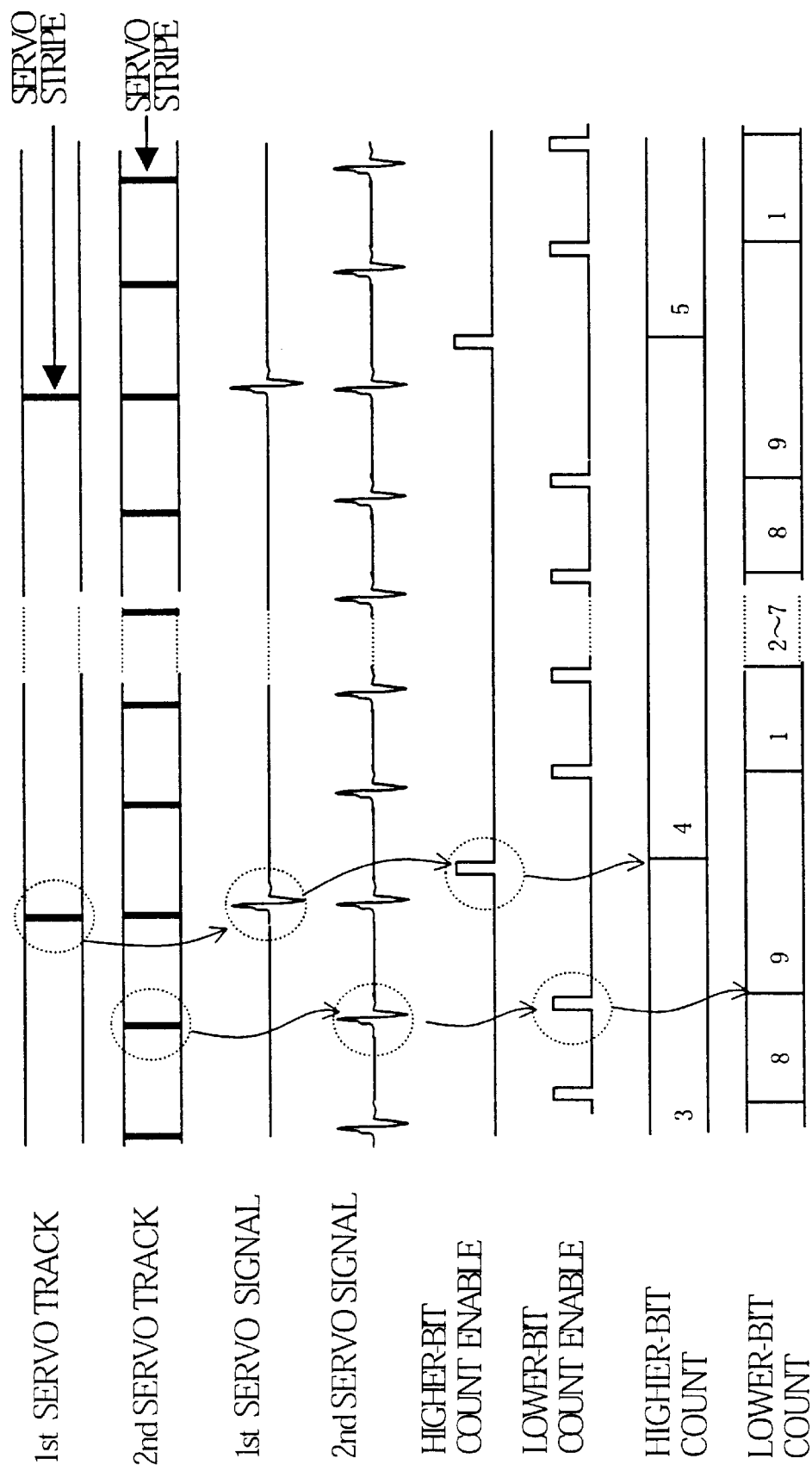
FIG. 23 illustrates another method for performing the tape position determining operation.

As previously described with reference to FIG. 3B, each servo track 72 may be provided with pieces of data arranged at a predetermined constant pitch (P) in the longitudinal direction of the magnetic tape 61. The present invention, however, is not limited to this. For instance, as shown in FIG. 23, a first servo track may be provided with pieces of positioning data arranged by a relatively greater pitch, while a second servo track may be provided with pieces of positioning data arranged by a relatively smaller pitch. In such an instance, use may be made of a counter including a higher-bit counting section and a lower-bit counting section. The higher-bit counting section may count the pulses of a signal obtained by reading out the pieces of data on the first servo track (longer data pitch), while the lower-bit counting section may count the pulses of a signal obtained by reading out the pieces of data on the second servo track (shorter data pitch).

With such an arrangement, the scale of the counter circuitry is advantageously reduced, thereby saving production cost. Further, even if a part of the shorter or longer pitch signal is accidentally lost, the counting operation can be performed based on the other complete signal. For instance, when the data of the shorter pitch signal is incomplete, the counting operation may be mainly performed based on the longer pitch signal.

In the above-described example, only two servo tracks are shown in FIG. 23. Clearly, three or more such servo tracks may be provided on the magnetic tape 61.

In accordance with the above idea, there may be provided a magnetic tape unit which includes a magnetic tape, a magnetic head and a tape position determiner. The magnetic tape is provided with tracks including at least first and second servo control tracks. Each of the servo control tracks is provided with pieces of data spaced from each other in the longitudinal direction of the magnetic tape. The pieces of data on the first servo control track are different in pitch from the pieces of data on the second control track. The tape position determiner determines the current running position of the magnetic tape by performing counting on signals read out from the first and the second servo control tracks.

Figure 24:
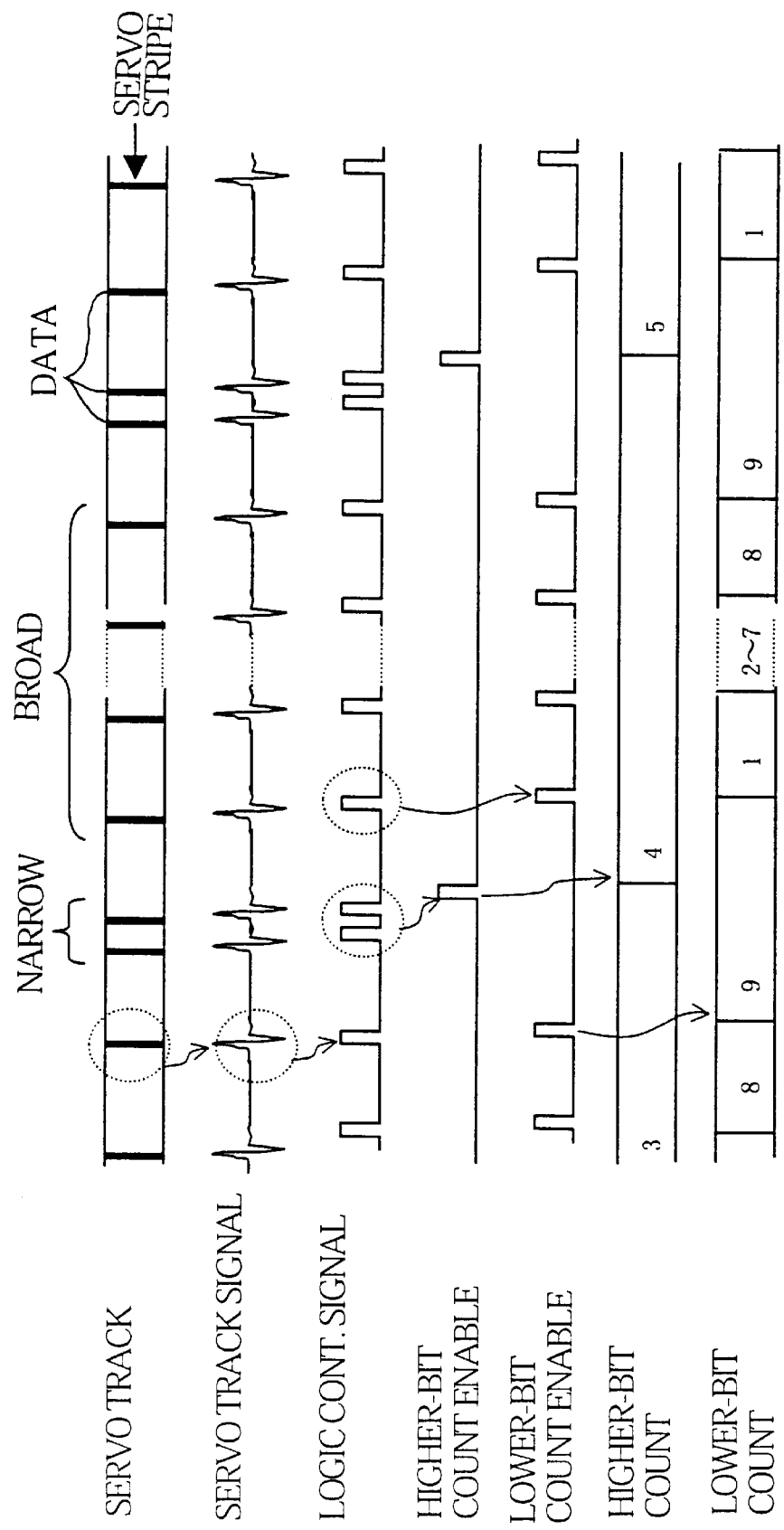
FIG. 24 illustrates still another method for performing the tape position determining operation.

According to the present invention, as shown in FIG. 24, a single servo track 72 may be provided with pieces of data which are arranged by unequal pitches. In the illustrated example, the servo control track is alternately provided with wider stripe regions and narrower stripe regions. The pieces of data in each narrower stripe region may be counted as one (1) by the higher-bit counting section of a counter. On the other hand, any one of the pieces of data in each wider stripe region may be counted as one (1) by the lower-bit counting section of the same counter.

In accordance with the above idea, there may be provided a magnetic tape unit which includes a magnetic tape, a magnetic head and a tape position determiner. The magnetic tape is provided with a plurality of tracks including a servo control track. This servo control track is provided with pieces of data spaced from each other in the longitudinal direction of the magnetic tape. The servo control track is alternately divided into wider stripe regions and narrower stripe regions. The pieces of data on the servo control track are spaced from each other by a greater distance in a wider stripe region than in a narrower stripe region. The magnetic head is arranged to simultaneously access a plurality of tracks for data-writing and data-reading. The tape position determiner determines the current running position of the magnetic tape by counting the pulses of a signal read out from the servo control track. The tape position determiner includes a higher-bit counting section and a lower-bit counting section. The higher-bit counting section counts the pieces of data in a narrower stripe region as one. The lower-bit counting section counts each of the pieces of data in a wider stripe region as one.

Figure 25:
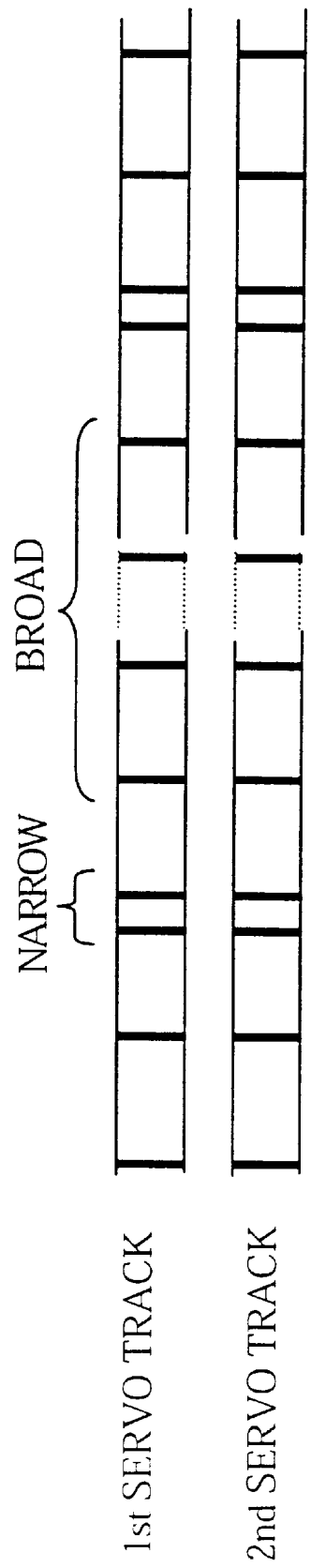
FIG. 25 illustrates still another method for performing the tape position determining operation.

According to the present invention, more than one servo track as shown in FIG. 24 may be provided on the magnetic tape 61. FIG. 25 shows two identical servo control tracks provided on the tape 61. As illustrated, each of the servo control tracks is alternately provided with wider stripe data regions and narrower stripe data regions.

In accordance with the above idea, there may be provided a magnetic tape unit which includes a magnetic tape, a magnetic head and a tape position determiner. The magnetic tape is provided with a plurality of tracks including at least first and second servo control tracks. Each of the servo control tracks is provided with pieces of data spaced from each other in the longitudinal direction of the magnetic tape. Each of the servo control tracks is alternately divided into wider stripe regions and narrower stripe regions. The pieces of data on each servo control track are spaced from each other by a greater distance in a wider stripe region than in a narrower stripe region. The magnetic head is arranged to simultaneously access a plurality of tracks for data-writing and data-reading. The tape position determiner determines the current running position of the magnetic tape by counting the pulses of signals read out from the first and the second servo control tracks. The tape position determiner includes a higher-bit counting section and a lower-bit counting section. The higher-bit counting section counts the pieces of data in a narrower stripe region as one. The lower-bit counting section counts each of the pieces of data in a wider stripe region as one.

Figure 26:
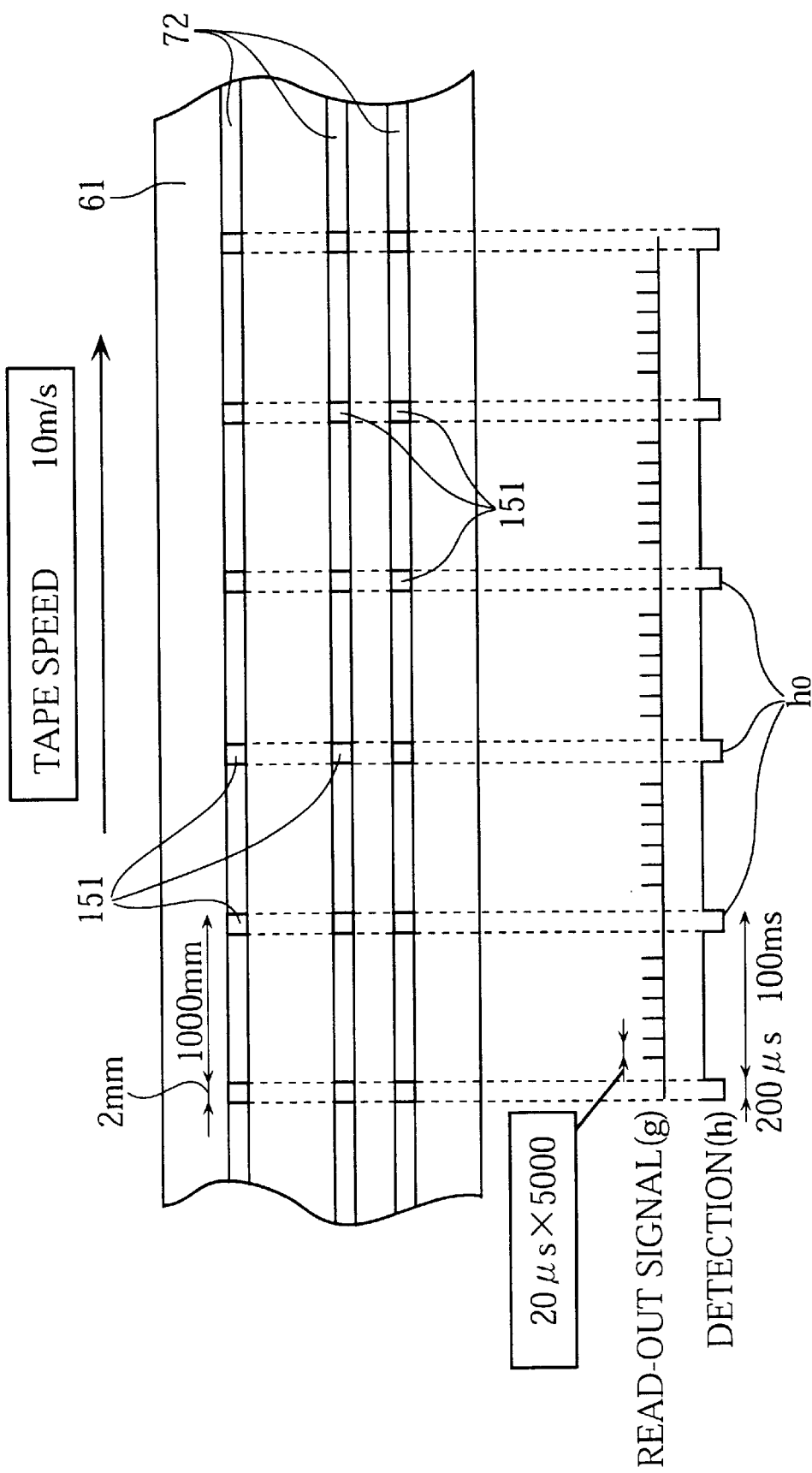
FIG. 26 illustrates still another method for performing the tape position determining operation.

According to the present invention, each servo control track 72 on the magnetic tape 61 may be provided with a plurality of nonmagnetic portions 151, as shown in FIG. 26. The nonmagnetic portions 151 in each servo control track are spaced from each other by a predetermined constant pitch (1000 mm in the illustrated example). Each nonmagnetic portion 151 has a length of 2 mm for example. Further, each servo control track is provided with pieces of data between successive nonmagnetic portions 151. In the illustrated example, 5000 pieces of data which are equally spaced are provided between successive nonmagnetic portions 151.

When the above-described magnetic tape 61 is run at 10 m/s for example, a signal read out from one servo control track 72 may have such a configuration (g) as shown in FIG. 26. This read-out signal is then converted into a nonmagnetic portion detecting signal (h) by a logic circuit of the magnetic tape unit. As readily understood, the recessed parts (h0) of the detection signal (h) correspond to the nonmagnetic portions 151 of the servo control track 72, from which no data will be read out. In the illustrated example, each recessed part (h0) lasts for 200 microseconds ($\mu$s).

Under the above circumstances, it may be determined that the magnetic head 10 is reading a nonmagnetic portion 151 on the servo track 72 when no data is detected for e.g. 100 $\mu$s or more. Every time a nonmagnetic portion 151 is detected, the count number in the counter will be incremented, whereby the current running position of the tape 61 can be calculated. The running speed of the tape 61 can also be calculated by measuring the time between the successive nonmagnetic portions 151. According to the present invention, each nonmagnetic portion 151 may be an opening or transparent part in the magnetic tape 61. Alternatively, a nonmagnetic material may be applied at the appropriate portions on the tape 61.

In accordance with the above idea, there may be provided a magnetic tape unit which includes a magnetic tape, a magnetic head, a nonmagnetic portion detector and a tape position determiner. The magnetic tape is provided with a plurality of tracks including a servo control track. This servo control track is provided with nonmagnetic portions spaced from each other in the longitudinal direction of the magnetic tape. The magnetic head is arranged to simultaneously access a plurality of tracks for data-writing and data-reading. The nonmagnetic portion detector detects the nonmagnetic portions on the tape, based on a signal read out from the servo control track. The tape position determiner determines the current running position of the magnetic tape by counting the nonmagnetic portions based on the detection of the nonmagnetic portion detector.

Further, there may be provided a magnetic tape unit which includes a magnetic tape, a magnetic head, a nonmagnetic portion detector and a tape speed calculator. The magnetic tape is provided with a plurality of tracks including a servo control track. This servo control track is provided with nonmagnetic portions spaced from each other in the longitudinal direction of the magnetic tape. The magnetic head is arranged to simultaneously access a plurality of tracks for data-writing and data-reading. The nonmagnetic portion detector detects the nonmagnetic portions, based on a signal read out from the servo control track. The tape speed determiner determines the current running speed of the magnetic tape by measuring the time between successive nonmagnetic portions based on the detection of the nonmagnetic portion detector.

Figure 27:
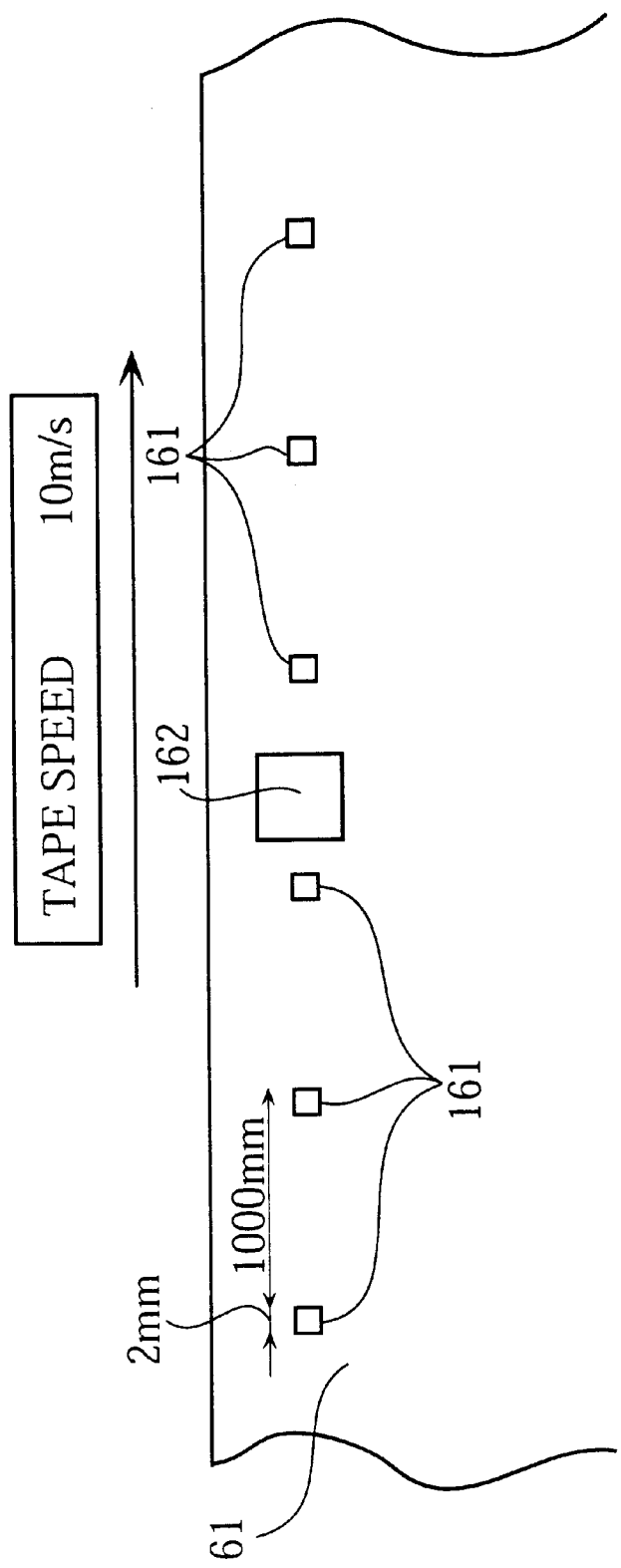
FIG. 27 illustrates still another method for performing the tape position determining operation.

When the nonmagnetic portions 161 are openings (through-holes) in the tape 61, use may be made of an optical sensor 162 for detecting these magnetic portions, as shown in FIG. 27. For preventing the mechanical strength of the tape 61 from becoming unduly weak, the tape 61 may be rendered partially transparent at the nonmagnetic portions instead of being formed with openings.

In accordance with the above idea, there may be provided a magnetic tape unit which includes a magnetic tape, a magnetic head, a sensor and a tape position determiner. The magnetic tape is provided with a plurality of tracks including a servo control track. The tape is also provided with a series of openings or transparent portions spaced from each other in the longitudinal direction of the magnetic tape. The sensor detects the openings or transparent portions. The tape position determiner determines the current running position of the magnetic tape by counting the openings or transparent portions based on the detection of the sensor.

Further, there may be provided a magnetic tape unit which includes a magnetic tape, a magnetic head, a sensor and a tape speed determiner. The magnetic tape is provided with a plurality of tracks including a servo control track. The magnetic tape is also provided with a series of openings or transparent portions spaced from each other in the longitudinal direction of the tape. The magnetic head is arranged to simultaneously access a plurality of tracks for data-writing and data-reading. The sensor detects the openings or transparent portions. The tape speed determiner determines the current running speed of the tape by measuring the time between successive openings or transparent portions based on the detection of the sensor.

In the above-described embodiments or examples, the user data tracks 71 and the servo control tracks 72 have the same magnetic characteristics, though the present invention is not limited to this. For instance, the user data tracks 71 may be made of a material whose magnetic characteristics are different from those of the servo control tracks 72. In this manner, preferably, the servo control tracks 72 may be rendered more resistant to data-rewriting and data deletion than the user data tracks 71.

With such an arrangement, it is possible to protect the data stored in the servo tracks 72 from being unexpectedly lost even when the magnetic head 10, which has been unduly offset in the widthwise direction of the tape 61 (Y-direction in FIG. 3A), is about to rewrite data to or delete data from the servo control tracks 72 other than the user data tracks 71.

In the above idea, there may be provided a magnetic tape unit which includes a magnetic tape and a magnetic head. The magnetic tape is provided with a plurality of tracks including a servo control track and a non-servo control track. The magnetic head is arranged to simultaneously access a plurality of tracks for data-writing and data-reading. The magnetic characteristics of the servo control track are rendered different from those of the non-servo control track, so that the data stored in the servo control track will remain intact even when a data-writing or data-deleting operation for the non-servo control track is erroneously performed to the servo control track.

Figure 28:
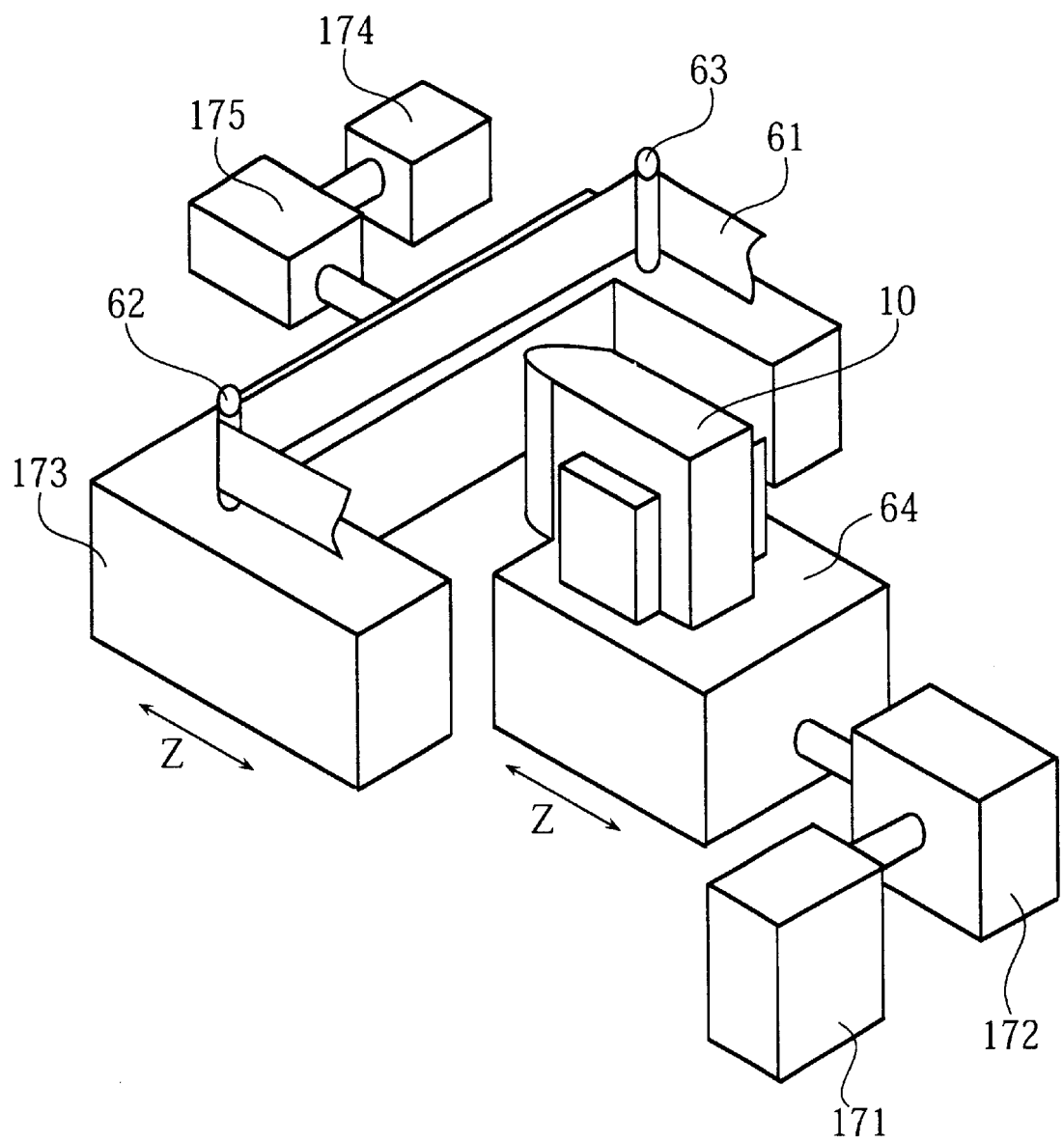
FIG. 28 is a perspective view schematically showing the principal components of a magnetic tape unit according to another embodiment of the present invention.

As previously described with reference to FIG. 2, the magnetic head 10 is caused to move in the Y-direction by the head position adjusting device 64, but not movable in the Z-direction (though the head 10 is rotatable about the Z- and X-axes). The present invention, however, is not limited to this. For instance, the magnetic head 10 may be arranged to move in the Z-direction and the opposite direction. In this case, as shown in FIG. 28, the magnetic head 10 may be mounted on a head-shifting device 64 which is movable toward or away from the recording surface of the magnetic tape 61. The head-shifting device 64 is connected to a motor 171 via a power transmission 172. Upon actuation of the motor 171, the shifting device 64 is moved toward or away from the tape 61, depending on e.g. whether the motor 171 is rotating forward or backward. Even when the motor 171 is a unidirectional one, the shifting direction of the device 64 may be changed through operation of the power transmission 172.

In addition to or in place of the above shifting arrangement, use may be made of a tape guide shifting device 173 which is connected to a motor 174 via a power transmission 175. As illustrated, the two tape guides 62, 63 are attached to the shifting device 173, which is movable in the Z-direction and the opposite direction upon actuation of the motor 174.

The operation of the above-described shifting device 64 or 173 is controlled based on the amplitude of a signal read out from the servo track 72. Specifically, when the amplitude of a read-out signal is smaller than a certain reference value, the distance between the head 10 and the tape 61 will be rendered smaller. On the other hand, when the amplitude is too great, the head 10 will be moved away from the tape 61. In this manner, the magnetic head 10 and the recording surface of the magnetic tape 61 will always be held at an appropriate distance from each other, which is necessary for performing a proper data-reading operation.

In accordance with the above idea, there may be provided a magnetic tape unit which includes a magnetic tape, a magnetic head and a position adjusting mechanism. The magnetic tape is provided with a plurality of tracks including a servo control track. This servo control track is provided with pieces of data spaced from each other in the longitudinal direction of the magnetic tape. The magnetic head is arranged to simultaneously access a plurality of tracks for data-writing and data-reading. The position adjusting mechanism moves the magnetic head and/or magnetic tape in a direction perpendicular to the head-facing surface of the magnetic tape, based on the amplitude of a signal which is read out from the servo control track.

As previously stated with reference to FIGS. 14–17, an improper facing relation between the head 10 and the tape 61 can be corrected based on signals which are read out from the servo tracks 72 on the tape 61. The present invention, however, is not limited to this. For instance, use may be made of an optical sensing technique for checking the facing relation between the head 10 and the tape 61. In this regard, reference is made to FIGS. 29 and 30 showing a magnetic head 10 provided with an optical sensor for checking the posture of the head 10 relative to the tape 61.

Figure 29:
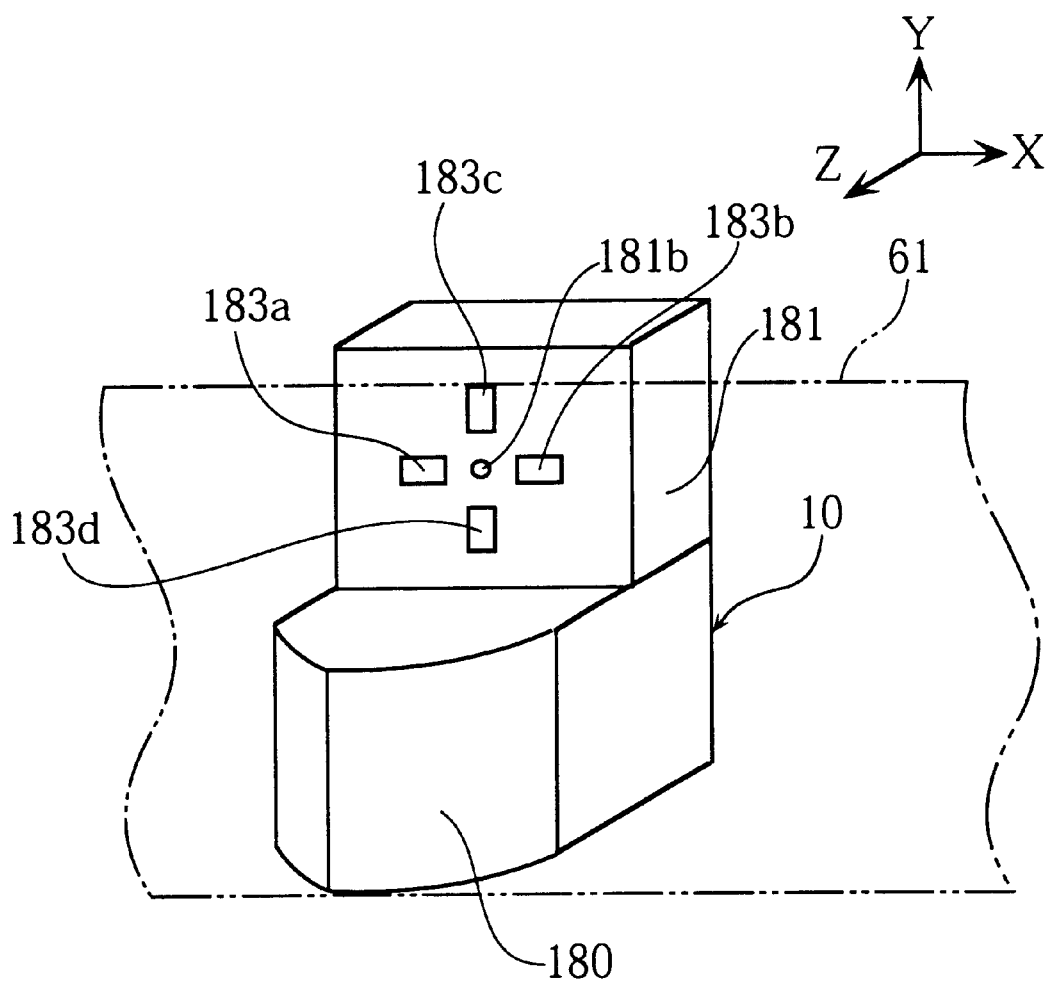
FIG. 29 is a perspective view schematically showing the principal components of a magnetic tape unit according to still another embodiment of the present invention.
Figure 30:
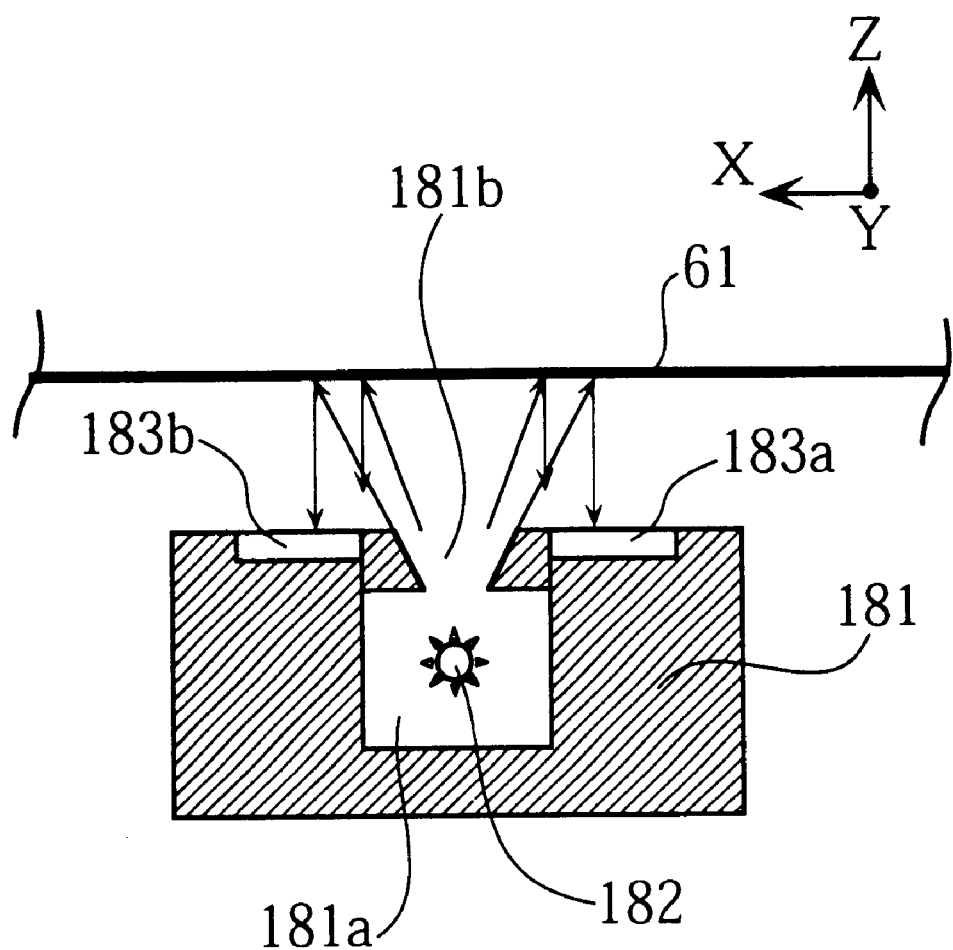
FIG. 30 is a sectional plan view showing the magnetic head of the magnetic tape unit of FIG. 29.

Specifically, as shown in FIG. 29, the magnetic head 10 consists of a protruding portion (or head portion) 180 and a sensing portion 181 arranged above the protruding portion 180. The protruding portion 180 may come into contact with the magnetic tape 61, while the sensing portion 181 is widely spaced from the tape 61. Referring also to FIG. 30, the sensing portion 181 is provided with a light source 182 for illuminating the magnetic tape 61 and with four light detectors 183*a*–183*d*. The light source 182 may be a light-emitting diode (LED), while each of the light detectors may be a charge coupled device (CCD). The light source 182 is accommodated in a chamber 181*a* formed in the sensing portion 181. The light emitted from the light source 182 goes out from the chamber 181*a* through a hole 181*b* having a circular cross section.

The emitted light is then reflected on the magnetic tape 61 and will be received by the light detectors 183*a*–183*d*. If the magnetic head 10, as viewed along the X-axis, is held in proper facing relation to the magnetic tape 61, the amount of light received by the light detector 183*a* is equal to the amount of light received by the light detector 183*b*. If otherwise, the amounts of light received by these two detectors will be different. The difference in amount of the received light will become greater, as the magnetic head 10 is more inclined relative to the magnetic tape 61. Similarly, if the magnetic head 10, as viewed along the Y-axis, is held in non-parallel facing relation to the tape 61, the amounts of light received by the light detectors 183*c*, 183*d* will be different accordingly.

Thus, the posture of the magnetic head 10 relative to the magnetic tape 61 can be corrected based on the light detection signals supplied from the light detectors 183*a*–183*d*.

In accordance with the above idea, there may be provided a magnetic tape unit which includes a magnetic tape, a magnetic head, an optical sensor and a posture determiner. The optical sensor, mounted on the magnetic head, includes a light source for illuminating the magnetic tape and a plurality of light detectors for receiving light reflected on the magnetic tape. The posture determiner determines, based on detection signals supplied from the light detectors, whether or not the magnetic head is held in parallel facing relation to the magnetic tape.

Further, there may be provided a magnetic tape unit which includes a magnetic tape, a magnetic head, an optical sensor, a posture determiner and a posture adjustor. The optical sensor, mounted on the magnetic head, includes a light source for illuminating the magnetic tape and a plurality of light detectors for receiving light reflected on the magnetic tape. The posture determiner determines, based on detection signals supplied from the light detectors, whether or not the magnetic head is held in parallel facing relation to the magnetic tape. The posture adjuster corrects the non-parallel facing relation between the head and the tape, based on the determination of the posture determiner. For performing this correction, the posture adjuster may eliminate the inclination of the magnetic head and/or guiding means for the magnetic tape.

Further, there may be provided a magnetic tape unit which includes a magnetic tape, a magnetic head, an optical sensor and a posture determiner. The magnetic tape is provided with a plurality of tracks including a servo control track. The magnetic head is arranged to simultaneously access a plurality of tracks for data-writing and data-reading. The optical sensor, mounted on the magnetic head, includes a light source for illuminating the magnetic tape and a plurality of light detectors for receiving light reflected on the magnetic tape. The posture determiner determines, based on detection signals supplied from the light detectors, whether or not the magnetic head is held in parallel facing relation to the magnetic tape.

Further, there may be provided a magnetic tape unit which includes a magnetic tape, a magnetic head, an optical sensor, a posture determiner and a posture adjuster. The magnetic tape is provided with a plurality of tracks including a servo control track. The magnetic head is arranged to simultaneously access a plurality of tracks for data-writing and data-reading. The optical sensor, mounted on the magnetic head, includes a light source for illuminating the magnetic tape and a plurality of light detectors for receiving light reflected on the magnetic tape. The posture determiner determines, based on detection signals supplied from the light detectors, whether or not the magnetic head is held in parallel facing relation to the magnetic tape. The posture adjustor corrects the non-parallel facing relation between the head and the tape, based on the determination of the posture determiner. For performing this correction, the posture adjuster may eliminate the inclination of the magnetic head and/or guiding means for the magnetic tape.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic tape unit comprising:
   a magnetic tape provided with a plurality of servo control tracks and user data tracks accessible for allowing a user to write data, the servo control tracks and the user data tracks being provided on a same side of the tape, the servo control tracks including at least first, second and third servo control tracks, the third servo control track being arranged between the first and the second servo control tracks, each of the servo control tracks being provided with identical pieces of data spaced from each other in a longitudinal direction of the tape, the pieces of data on the first servo control track being aligned with the pieces of data on the second servo control track in a widthwise direction of the tape, the pieces of data on the third servo control track being offset from the pieces of data on the first and the second servo control tracks in the longitudinal direction of the tape;
   a magnetic head arranged to simultaneously access only a smaller number of tracks than all the tracks on said same side of the tape for data-writing and data-reading, the magnetic head having a maximum access width corresponding to a distance by which the first and the second servo control tracks are spaced from each other in the widthwise direction of the tape;
   a relative position determiner for determining a relative positional relation between the magnetic head and the magnetic tape based on signals read out from the first and the second servo control tracks; and a position compensator for keeping the magnetic head and the magnetic tape in proper positional relation by adjusting the relative positional relation between the head and the tape based on the determination of the relative position determiner.

2. The magnetic tape unit according to claim 1, further comprising a running condition determiner for determining a running condition of the tape based on a signal read out from the servo control track.

3. The magnetic tape unit according to claim 2, wherein the running condition of the tape is a running position of the tape relative to the magnetic head.

4. The magnetic tape unit according to claim 2, wherein the running condition of the tape is a running speed of the tape relative to the magnetic head.

5. The magnetic tape unit according to claim 1, further comprising a facing relation determiner and a facing relation compensator, wherein the facing relation determiner determines, based on levels of signals read out from the first and the second servo control tracks, whether or not the magnetic head is held in proper facing relation to the magnetic tape, and wherein the facing relation compensator adjusts the facing relation between the head and the tape based on the determination of the facing relation determiner.

6. The magnetic tape unit according to claim 1, wherein the magnetic tape comprises a servo control track provided with non-magnetic portions spaced from each other in the longitudinal direction of the tape for determining a running condition of the magnetic tape.

7. The magnetic tape unit according to claim 6, wherein the running condition of the tape is a running position of the tape relative to the magnetic head.

8. The magnetic tape unit according to claim 6, wherein the running condition of the tape is a running speed of the tape relative to the magnetic head.

* * * * *